US012236910B2

(12) United States Patent
Sako et al.

(10) Patent No.: US 12,236,910 B2

(45) Date of Patent: Feb. 25, 2025

(54) DISPLAY DEVICE AND DISPLAY SYSTEM WITH LIGHTING CONTROL BASED ON MOVEMENT

(71) Applicant: Japan Display Inc., Tokyo (JP)

(72) Inventors: Kazuhiko Sako, Tokyo (JP); Yoshihiro Watanabe, Tokyo (JP); Tomoyuki Ishihara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/521,650

(22) Filed: Nov. 28, 2023

(65) Prior Publication Data

US 2024/0185813 A1 Jun. 6, 2024

(30) Foreign Application Priority Data

Dec. 6, 2022 (JP) ................................ 2022-194975

(51) Int. Cl.

*G09G 3/34* (2006.01)
*G09G 3/36* (2006.01)
*G02B 27/01* (2006.01)

(52) U.S. Cl.

CPC ....... *G09G 3/3607* (2013.01); *G02B 27/0172* (2013.01); *G02B 2207/101* (2013.01); *G09G 2320/064* (2013.01); *G09G 2320/0666* (2013.01)

(58) Field of Classification Search

CPC .......... G09G 3/3607; G09G 2320/064; G09G 2320/0666; G09G 3/34–3426; G02B 27/0172; G02B 2207/101

See application file for complete search history.

(56) References Cited

U.S. PATENT DOCUMENTS

| | | | | |
|---|---|---|---|---|
| 2015/0055025 A1 | 2/2015 | Gotoh | | |
| 2017/0309233 A1* | 10/2017 | Patel | .................... | G09G 3/3406 |
| 2023/0274710 A1* | 8/2023 | Chen | ........................ | G09G 3/32 345/690 |

FOREIGN PATENT DOCUMENTS

| | | |
|---|---|---|
| JP | 2013182268 A | 9/2013 |
| JP | 2020076831 A | 5/2020 |

* cited by examiner

*Primary Examiner* — Roy P Rabindranath

(74) *Attorney, Agent, or Firm* — K&L Gates LLP

(57) ABSTRACT

A display device includes a display panel comprising a display region for displaying an image, a light source device comprising a plurality of light sources configured to emit light toward the display panel, and a drive circuit configured to drive the display panel based on an image signal including information on the image.

12 Claims, 35 Drawing Sheets

21a (21)
21b (21)
SIGNAL PROCESSING CIRCUIT
SIGNAL OUTPUT CIRCUIT
SCANNING CIRCUIT
DA
CE
CS
LC
PE
SW
SP1
SP2
SP3
Lb
Lc
22
21c (22)
20
X
Y 20
26
24
AL
23
AL
IL
CE
22
25
SP3 (SP)
SP2 (SP)
SP1 (SP)
PE
CF
SM
LM
X
Y
Z

FIG.19

FRAME N

REQUIRED AMOUNT OF LIGHT OF SMALL DIVIDED REGION

| | [h=0] | | [h=1] | | [h=2] | | [h=3] | | [h=4] | | [h=5] | |
|---|---|---|---|---|---|---|---|---|---|---|---|---|
| [v=0] | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 |
| [v=1] | 0 | 0 | 0 | 0 | 0 | 0 | 0 | 0 | 100 | 0 | 0 | 0 |
| | 0 | 0 | 0 | 0 | 0 | 0 | 0 | 0 | 0 | 0 | 0 | 0 |
| [v=2] | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 |
| [v=3] | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 |

DA

Ds

REQUIRED AMOUNT OF LIGHT OF DIVIDED REGION

| | [h=0] | [h=1] | [h=2] | [h=3] | [h=4] | [h=5] |
|---|---|---|---|---|---|---|
| [v=0] | 0 | 0 | 0 | 0 | 0 | 0 |
| [v=1] | 0 | 0 | 0 | 0 | 100 | 0 |
| [v=2] | 0 | 0 | 0 | 0 | 0 | 0 |
| [v=3] | 0 | 0 | 0 | 0 | 0 | 0 |

FRAME N

TENTATIVE REQUIRED LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 0 | 0 | 0 | 0 |
| [v=1] | 0 | 0 | 0 | 0 | 115 | 0 |
| [v=2] | 0 | 0 | 0 | 0 | 0 | 0 |
| [v=3] | 0 | 0 | 0 | 0 | 0 | 0 |

DA
Dd

REQUIRED LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 0 | 0 | 50 | 0 |
| [v=1] | 0 | 0 | 0 | 50 | 115 | 0 |
| [v=2] | 0 | 0 | 0 | 0 | 0 | 0 |
| [v=3] | 0 | 0 | 0 | 0 | 0 | 0 |

DA
Dd

ACTUAL LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 0 | 0 | 50 | 0 |
| [v=1] | 0 | 0 | 0 | 50 | 115 | 0 |
| [v=2] | 0 | 0 | 0 | 0 | 0 | 0 |
| [v=3] | 0 | 0 | 0 | 0 | 0 | 0 |

FRAME N+1

REQUIRED AMOUNT OF LIGHT OF SMALL DIVIDED REGION

| | [h=0] | | [h=1] | | [h=2] | | [h=3] | | [h=4] | | [h=5] | |
|---|---|---|---|---|---|---|---|---|---|---|---|---|
| [v=0] | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 |
| [v=1] | 0 | 0 | 0 | 0 | 0 | 0 | 100 | 0 | 0 | 0 | 0 | 0 |
| | 0 | 0 | 0 | 0 | 0 | 0 | 0 | 0 | 0 | 0 | 0 | 0 |
| [v=2] | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 |
| [v=3] | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 |

DA

Ds

REQUIRED AMOUNT OF LIGHT OF DIVIDED REGION

| | [h=0] | [h=1] | [h=2] | [h=3] | [h=4] | [h=5] |
|---|---|---|---|---|---|---|
| [v=0] | 0 | 0 | 0 | 0 | 0 | 0 |
| [v=1] | 0 | 0 | 0 | 100 | 0 | 0 |
| [v=2] | 0 | 0 | 0 | 0 | 0 | 0 |
| [v=3] | 0 | 0 | 0 | 0 | 0 | 0 |

FRAME N+1

TENTATIVE REQUIRED LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 0 | 0 | 0 | 0 |
| [v=1] | 0 | 0 | 0 | 115 | 0 | 0 |
| [v=2] | 0 | 0 | 0 | 0 | 0 | 0 |
| [v=3] | 0 | 0 | 0 | 0 | 0 | 0 |

DA
Dd

REQUIRED LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 0 | 50 | 0 | 0 |
| [v=1] | 0 | 0 | 50 | 115 | 0 | 0 |
| [v=2] | 0 | 0 | 0 | 0 | 0 | 0 |
| [v=3] | 0 | 0 | 0 | 0 | 0 | 0 |

DA
Dd

ACTUAL LUMINANCE OF LIGHT SOURCE

| | [h=0] | [h=1] | [h=2] | [h=3] | [h=4] | [h=5] |
|---|---|---|---|---|---|---|
| [v=0] | 100 | 100 | 100 | 100 | 100 | 100 |
| [v=1] | 100 | 100 | 100 | 100 | 100 | 100 |
| [v=2] | 100 | 100 | 100 | 100 | 100 | 100 |
| [v=3] | 100 | 100 | 100 | 100 | 100 | 100 |

FRAME N+2

REQUIRED AMOUNT OF LIGHT OF SMALL DIVIDED REGION

| | [h=0] | | [h=1] | | [h=2] | | [h=3] | | [h=4] | | [h=5] | |
|---|---|---|---|---|---|---|---|---|---|---|---|---|
| [v=0] | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 |
| [v=1] | 0 | 0 | 0 | 0 | 100 | 0 | 0 | 0 | 0 | 0 | 0 | 0 |
| | 0 | 0 | 0 | 0 | 0 | 0 | 0 | 0 | 0 | 0 | 0 | 0 |
| [v=2] | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 |
| [v=3] | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 |

DA

Ds

REQUIRED AMOUNT OF LIGHT OF DIVIDED REGION

| | [h=0] | [h=1] | [h=2] | [h=3] | [h=4] | [h=5] |
|---|---|---|---|---|---|---|
| [v=0] | 0 | 0 | 0 | 0 | 0 | 0 |
| [v=1] | 0 | 0 | 100 | 0 | 0 | 0 |
| [v=2] | 0 | 0 | 0 | 0 | 0 | 0 |
| [v=3] | 0 | 0 | 0 | 0 | 0 | 0 |

FRAME N+2

TENTATIVE REQUIRED LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 0 | 0 | 0 | 0 | 0 | 0 |
| [v=1] | 0 | 0 | 115 | 0 | 0 | 0 |
| [v=2] | 0 | 0 | 0 | 0 | 0 | 0 |
| [v=3] | 0 | 0 | 0 | 0 | 0 | 0 |

REQUIRED LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 0 | 0 | 50 | 0 | 0 | 0 |
| [v=1] | 0 | 50 | 115 | 0 | 0 | 0 |
| [v=2] | 0 | 0 | 0 | 0 | 0 | 0 |
| [v=3] | 0 | 0 | 0 | 0 | 0 | 0 |

ACTUAL LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 100 | 100 | 100 | 100 | 100 | 100 |
| [v=1] | 100 | 100 | 100 | 100 | 100 | 100 |
| [v=2] | 100 | 100 | 100 | 100 | 100 | 100 |
| [v=3] | 100 | 100 | 100 | 100 | 100 | 100 |

FIG.27

FRAME N+1

REQUIRED LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 0 | 0 | 0 | 50 | 0 | 0 |
| [v=1] | 0 | 0 | 50 | 115 | 0 | 0 |
| [v=2] | 0 | 0 | 0 | 0 | 0 | 0 |
| [v=3] | 0 | 0 | 0 | 0 | 0 | 0 |

TENTATIVE ACTUAL LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 0 | 0 | 0 | 50 | 0 | 0 |
| [v=1] | 0 | 0 | 50 | 115 | 0 | 0 |
| [v=2] | 0 | 0 | 0 | 0 | 0 | 0 |
| [v=3] | 0 | 0 | 0 | 0 | 0 | 0 |

ACTUAL LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 50 | 50 | 50 | 50 | 50 | 50 |
| [v=1] | 50 | 50 | 50 | 100 | 50 | 50 |
| [v=2] | 50 | 50 | 50 | 50 | 50 | 50 |
| [v=3] | 50 | 50 | 50 | 50 | 50 | 50 |

FIG.28

FRAME N+2

REQUIRED LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 50 | 0 | 0 | 0 |
| [v=1] | 0 | 50 | 115 | 0 | 0 | 0 |
| [v=2] | 0 | 0 | 0 | 0 | 0 | 0 |
| [v=3] | 0 | 0 | 0 | 0 | 0 | 0 |

DA
Dd

TENTATIVE ACTUAL LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 50 | 0 | 0 | 0 |
| [v=1] | 0 | 50 | 115 | 0 | 0 | 0 |
| [v=2] | 0 | 0 | 0 | 0 | 0 | 0 |
| [v=3] | 0 | 0 | 0 | 0 | 0 | 0 |

DA
Dd

ACTUAL LUMINANCE OF LIGHT SOURCE

| | [h=0] | [h=1] | [h=2] | [h=3] | [h=4] | [h=5] |
|---|---|---|---|---|---|---|
| [v=0] | 100 | 100 | 100 | 100 | 100 | 100 |
| [v=1] | 100 | 100 | 100 | 100 | 100 | 100 |
| [v=2] | 100 | 100 | 100 | 100 | 100 | 100 |
| [v=3] | 100 | 100 | 100 | 100 | 100 | 100 |

FRAME N+1

REQUIRED LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 0 | 50 | 0 | 0 |
| [v=1] | 0 | 0 | 50 | 115 | 0 | 0 |
| [v=2] | 0 | 0 | 0 | 0 | 0 | 0 |
| [v=3] | 0 | 0 | 0 | 0 | 0 | 0 |

DA, Dd

TENTATIVE ACTUAL LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 0 | 25 | 25 | 0 |
| [v=1] | 0 | 0 | 25 | 82.5 | 57.5 | 0 |
| [v=2] | 0 | 0 | 0 | 0 | 0 | 0 |
| [v=3] | 0 | 0 | 0 | 0 | 0 | 0 |

DA, Dd

ACTUAL LUMINANCE OF LIGHT SOURCE

| | [h=0] | [h=1] | [h=2] | [h=3] | [h=4] | [h=5] |
|---|---|---|---|---|---|---|
| [v=0] | 50 | 50 | 50 | 50 | 50 | 50 |
| [v=1] | 50 | 50 | 50 | 82.5 | 57.5 | 50 |
| [v=2] | 50 | 50 | 50 | 50 | 50 | 50 |
| [v=3] | 50 | 50 | 50 | 50 | 50 | 50 |

FRAME N+2

REQUIRED LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 50 | 0 | 0 | 0 |
| [v=1] | 0 | 50 | 115 | 0 | 0 | 0 |
| [v=2] | 0 | 0 | 0 | 0 | 0 | 0 |
| [v=3] | 0 | 0 | 0 | 0 | 0 | 0 |

DA
Dd

TENTATIVE ACTUAL LUMINANCE OF LIGHT SOURCE

| | [h=0] | [h=1] | [h=2] | [h=3] | [h=4] | [h=5] |
|---|---|---|---|---|---|---|
| [v=0] | 25 | 25 | 50 | 25 | 25 | 25 |
| [v=1] | 25 | 50 | 82.5 | 41.25 | 28.75 | 25 |
| [v=2] | 25 | 25 | 25 | 25 | 25 | 25 |
| [v=3] | 25 | 25 | 25 | 25 | 25 | 25 |

DA
Dd

ACTUAL LUMINANCE OF LIGHT SOURCE

| | [h=0] | [h=1] | [h=2] | [h=3] | [h=4] | [h=5] |
|---|---|---|---|---|---|---|
| [v=0] | 100 | 100 | 100 | 100 | 100 | 100 |
| [v=1] | 100 | 100 | 100 | 100 | 100 | 100 |
| [v=2] | 100 | 100 | 100 | 100 | 100 | 100 |
| [v=3] | 100 | 100 | 100 | 100 | 100 | 100 |

FRAME N+1

REQUIRED LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 0 | 0 | 0 | 50 | 0 | 0 |
| [v=1] | 0 | 0 | 50 | 115 | 0 | 0 |
| [v=2] | 0 | 0 | 0 | 0 | 0 | 0 |
| [v=3] | 0 | 0 | 0 | 0 | 0 | 0 |

TENTATIVE ACTUAL LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 0 | 0 | 0 | 0 | 50 | 0 |
| [v=1] | 0 | 0 | 0 | 50 | 115 | 0 |
| [v=2] | 0 | 0 | 0 | 0 | 0 | 0 |
| [v=3] | 0 | 0 | 0 | 0 | 0 | 0 |

ACTUAL LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 50 | 50 | 50 | 50 | 50 | 50 |
| [v=1] | 50 | 50 | 50 | 50 | 100 | 50 |
| [v=2] | 50 | 50 | 50 | 50 | 50 | 50 |
| [v=3] | 50 | 50 | 50 | 50 | 50 | 50 |

FIG.32

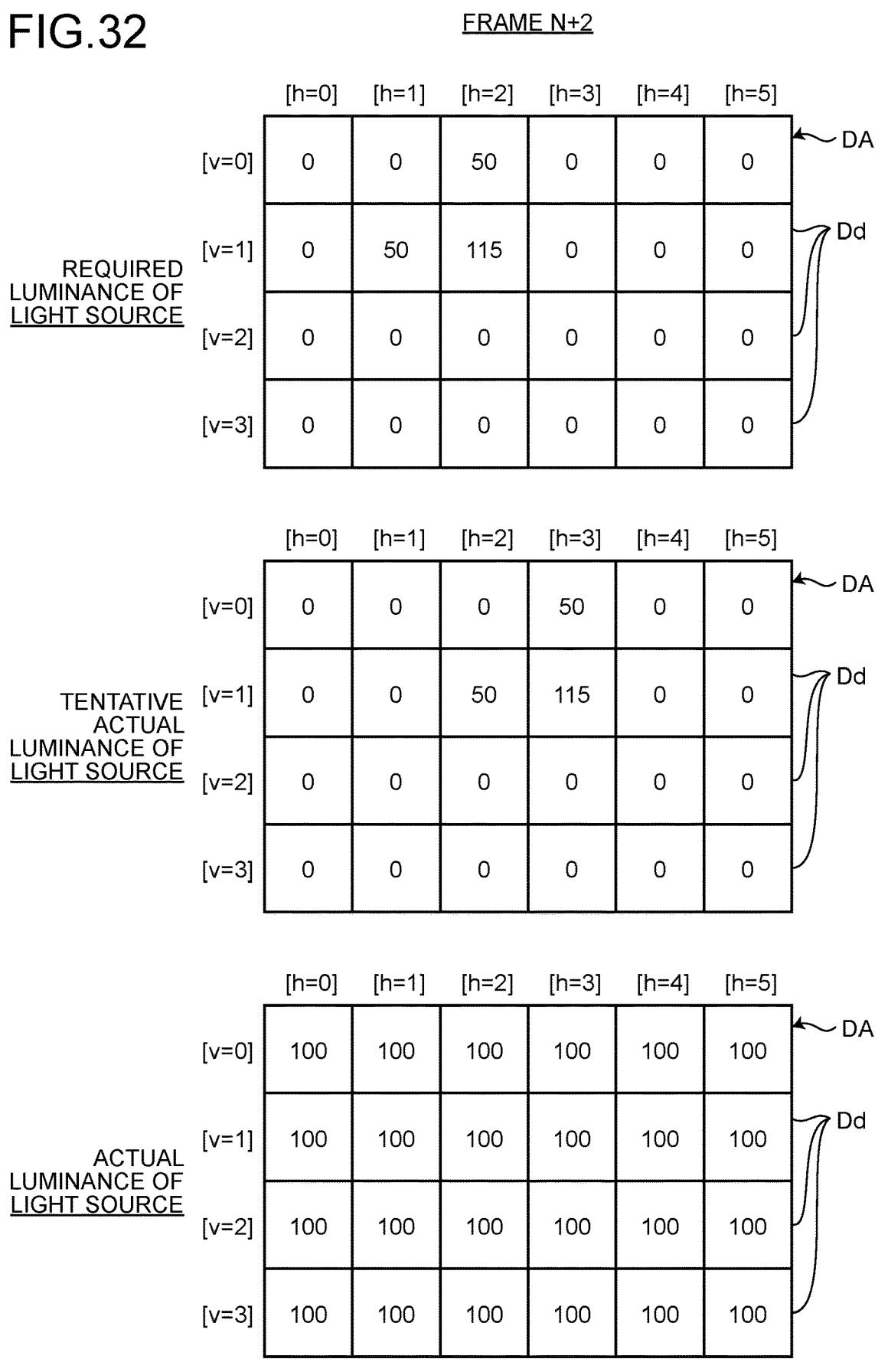

FRAME N+2

REQUIRED LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 50 | 0 | 0 | 0 |
| [v=1] | 0 | 50 | 115 | 0 | 0 | 0 |
| [v=2] | 0 | 0 | 0 | 0 | 0 | 0 |
| [v=3] | 0 | 0 | 0 | 0 | 0 | 0 |

TENTATIVE ACTUAL LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 0 | 50 | 0 | 0 |
| [v=1] | 0 | 0 | 50 | 115 | 0 | 0 |
| [v=2] | 0 | 0 | 0 | 0 | 0 | 0 |
| [v=3] | 0 | 0 | 0 | 0 | 0 | 0 |

ACTUAL LUMINANCE OF LIGHT SOURCE

| | [h=0] | [h=1] | [h=2] | [h=3] | [h=4] | [h=5] |
|---|---|---|---|---|---|---|
| [v=0] | 100 | 100 | 100 | 100 | 100 | 100 |
| [v=1] | 100 | 100 | 100 | 100 | 100 | 100 |
| [v=2] | 100 | 100 | 100 | 100 | 100 | 100 |
| [v=3] | 100 | 100 | 100 | 100 | 100 | 100 |

FIG.33

FRAME N+2

REQUIRED LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 0 | 0 | 50 | 0 | 0 | 0 |
| [v=1] | 0 | 50 | 115 | 0 | 0 | 0 |
| [v=2] | 0 | 0 | 0 | 0 | 0 | 0 |
| [v=3] | 0 | 0 | 0 | 0 | 0 | 0 |

TENTATIVE ACTUAL LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 25 | 25 | 25 | 50 | 25 | 25 |
| [v=1] | 25 | 25 | 50 | 82.5 | 50 | 25 |
| [v=2] | 25 | 25 | 25 | 25 | 25 | 25 |
| [v=3] | 25 | 25 | 25 | 25 | 25 | 25 |

ACTUAL LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 100 | 100 | 100 | 100 | 100 | 100 |
| [v=1] | 100 | 100 | 100 | 100 | 100 | 100 |
| [v=2] | 100 | 100 | 100 | 100 | 100 | 100 |
| [v=3] | 100 | 100 | 100 | 100 | 100 | 100 |

FIG.34

FRAME N+1

REQUIRED LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 0 | 50 | 0 | 0 |
| [v=1] | 0 | 0 | 50 | 115 | 0 | 0 |
| [v=2] | 0 | 0 | 0 | 0 | 0 | 0 |
| [v=3] | 0 | 0 | 0 | 0 | 0 | 0 |

DA
Dd

TENTATIVE ACTUAL LUMINANCE OF LIGHT SOURCE

| | [h=0] | [h=1] | [h=2] | [h=3] | [h=4] | [h=5] |
|---|---|---|---|---|---|---|
| [v=0] | 0 | 0 | 0 | 50 | 0 | 100 |
| [v=1] | 0 | 0 | 50 | 115 | 0 | 100 |
| [v=2] | 0 | 0 | 0 | 0 | 0 | 100 |
| [v=3] | 0 | 0 | 0 | 0 | 0 | 100 |

DA
Dd

ACTUAL LUMINANCE OF LIGHT SOURCE

| | [h=0] | [h=1] | [h=2] | [h=3] | [h=4] | [h=5] |
|---|---|---|---|---|---|---|
| [v=0] | 50 | 50 | 50 | 50 | 50 | 100 |
| [v=1] | 50 | 50 | 50 | 100 | 50 | 100 |
| [v=2] | 50 | 50 | 50 | 50 | 50 | 100 |
| [v=3] | 50 | 50 | 50 | 50 | 50 | 100 |

FRAME N+2

REQUIRED LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 0 | 0 | 50 | 0 | 0 | 0 |
| [v=1] | 0 | 50 | 115 | 0 | 0 | 0 |
| [v=2] | 0 | 0 | 0 | 0 | 0 | 0 |
| [v=3] | 0 | 0 | 0 | 0 | 0 | 0 |

TENTATIVE ACTUAL LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 50 | 50 | 50 | 50 | 100 | 100 |
| [v=1] | 50 | 50 | 100 | 50 | 100 | 100 |
| [v=2] | 50 | 50 | 50 | 50 | 100 | 100 |
| [v=3] | 50 | 50 | 50 | 50 | 100 | 100 |

ACTUAL LUMINANCE OF LIGHT SOURCE (DA, Dd)

| | [h=0] | [h=1] | [h=2] | [h=3] | [h=4] | [h=5] |
|---|---|---|---|---|---|---|
| [v=0] | 100 | 100 | 100 | 100 | 100 | 100 |
| [v=1] | 100 | 100 | 100 | 100 | 100 | 100 |
| [v=2] | 100 | 100 | 100 | 100 | 100 | 100 |
| [v=3] | 100 | 100 | 100 | 100 | 100 | 100 |

DISPLAY DEVICE AND DISPLAY SYSTEM WITH LIGHTING CONTROL BASED ON MOVEMENT

CROSS-REFERENCE TO RELATED APPLICATION

This application claims the benefit of priority from Japanese Patent Application No. 2022-194975 filed on Dec. 6, 2022, the entire contents of which are incorporated herein by reference.

BACKGROUND

1. Technical Field

The present disclosure relates to a display device and a display system.

2. Description of the Related Art

Japanese Patent Application Laid-open Publication No. 2020-76831 discloses a display device including display units, which are liquid crystal displays, having a display region for displaying images and backlights that emit light toward the respective display units. The display device performs what is called local dimming. Local dimming is processing for adjusting the luminance of each of light sources depending on an image displayed on the display unit (display panel) disposed corresponding to a plurality of segmented regions obtained by dividing an emission region from which light is emitted by the backlight (light source device).

Let us assume a case where the image displayed in the display region includes both a high-luminance part with relatively high luminance and a low-luminance part with relatively low luminance, for example. In this case, the display device performs local dimming to make the luminance of the light source that irradiates the segmented region where the low-luminance part is positioned lower than that of the light source that irradiates the segmented region where the high-luminance part is positioned. As a result, light leakage between a plurality of sub-pixels is suppressed in the segmented region where the low-luminance part is positioned, thereby improving the contrast of the image displayed in the display region.

In local dimming, when the high-luminance part of the image moves in the display region, the luminance of the light sources is adjusted according to the movement of the high-luminance part. Japanese Patent Application Laid-open Publication No. 2013-182268 also discloses a display device that performs local dimming.

Such display devices have recently been used in display systems (e.g., virtual reality (VR) systems) that change images according to the movement of the display panel caused by a motion of a user, for example. In such display systems, when the display panel moves relatively fast, the high-luminance part of the image displayed in the display region moves relatively fast. At this time, the delay in adjusting the luminance of the light source by local dimming may possibly cause insufficient luminance of the light source that irradiates the segmented region where the high-luminance part is positioned. If the luminance of the light source is insufficient, the amount of light in the display region is insufficient, and the luminance of the high-luminance part is reduced. As a result, the image may possibly be displayed darker.

An object of the present disclosure is to suppress insufficient luminance of a light source in a display device and a display system that performs local dimming.

SUMMARY

A display device according to the present disclosure includes a display panel comprising a display region for displaying an image, a light source device comprising a plurality of light sources configured to emit light toward the display panel, and a drive circuit configured to drive the display panel based on an image signal including information on the image. The display region is divided into a plurality of divided regions, the light sources are disposed corresponding to the respective divided regions, the drive circuit selects one of first lighting control for adjusting luminance of the light source for each of the light sources based on the image signal and second lighting control for turning on all the light sources to control the light source device, and the drive circuit selects the second lighting control based on an amount of movement per unit time of the display panel being equal to or larger than a predetermined amount of movement.

A display device according to the present disclosure includes a display panel comprising a display region for displaying an image, a light source device comprising a plurality of light sources configured to emit light toward the display panel, a sensor configured to detect acceleration of the display panel, and a drive circuit configured to drive the display panel based on an image signal including information on the image. The display region is divided into a plurality of divided regions, the light sources are disposed corresponding to the respective divided regions, the drive circuit calculates an amount of movement per unit time of the display panel based on a detection value of the sensor, the drive circuit selects one of first lighting control for adjusting luminance of the light source for each of the light sources based on the image signal and second lighting control for turning on all the light sources to control the light source device, and the drive circuit selects the second lighting control based on an amount of movement per unit time of the display panel being equal to or larger than a predetermined amount of movement.

A display system according to the present disclosure includes the display device above, and a lens.

BRIEF DESCRIPTION OF THE DRAWINGS

FIG. 19 is a diagram of the required amount of light of small divided regions and the required amount of light of the divided regions corresponding to the display image of a frame N;

FIG. 20 is a diagram of the tentative required luminance of the light source, the required luminance of the light source, and actual luminance of the light source corresponding to the required amount of light of the divided regions of the frame N illustrated in FIG. 19;

FIG. 22 is a diagram of the required amount of light of the small divided regions and the required amount of light of the divided regions corresponding to the display image of a frame N+1;

FIG. 23 is a diagram of the tentative required luminance of the light source, the required luminance of the light source, and the actual luminance of the light source corresponding to the required amount of light of the divided regions of the frame N+1 illustrated in FIG. 22;

FIG. 24 is a diagram of the required amount of light of the small divided regions and the required amount of light of the divided regions corresponding to the display image of a frame N+2;

FIG. 25 is a diagram of the tentative required luminance of the light source, the required luminance of the light source, and the actual luminance of the light source corresponding to the required amount of light of the divided regions of the frame N+2 illustrated in FIG. 24;

FIG. 27 is a diagram of the required luminance of the light source, tentative actual luminance of the light source, and the actual luminance of the light source in the divided regions of the frame N+1 according to the first modification of the embodiment of the present disclosure;

FIG. 28 is a diagram of the required luminance of the light source, the tentative actual luminance of the light source, and the actual luminance of the light source in the divided regions of the frame N+2 according to the first modification of the embodiment of the present disclosure;

FIG. 29 is a diagram of the required luminance of the light source, the tentative actual luminance of the light source, and the actual luminance of the light source in the divided regions of the frame N+1 according to a second modification of the embodiment of the present disclosure;

FIG. 30 is a diagram of the required luminance of the light source, the tentative actual luminance of the light source, and the actual luminance of the light source in the divided regions of the frame N+2 according to the second modification of the embodiment of the present disclosure;

FIG. 31 is a diagram of the required luminance of the light source, the tentative actual luminance of the light source, and the actual luminance of the light source in the divided regions of the frame N+1 according to a third modification of the embodiment of the present disclosure;

FIG. 32 is a diagram of the required luminance of the light source, the tentative actual luminance of the light source, and the actual luminance of the light source in the divided regions of the frame N+2 according to the third modification of the embodiment of the present disclosure;

FIG. 33 is a diagram of the required luminance of the light source, the tentative actual luminance of the light source, and the actual luminance of the light source in the divided regions of the frame N+2 according to a fourth modification of the embodiment of the present disclosure;

FIG. 34 is a diagram of the required luminance of the light source, the tentative actual luminance of the light source, and the actual luminance of the light source in the divided regions of the frame N+1 according to a fifth modification of the embodiment of the present disclosure; and FIG. 35 is a diagram of the required luminance of the light source, the tentative actual luminance of the light source, and the actual luminance of the light source in the divided regions of the frame N+2 according to the fifth modification of the embodiment of the present disclosure.

DETAILED DESCRIPTION

Figure 1:
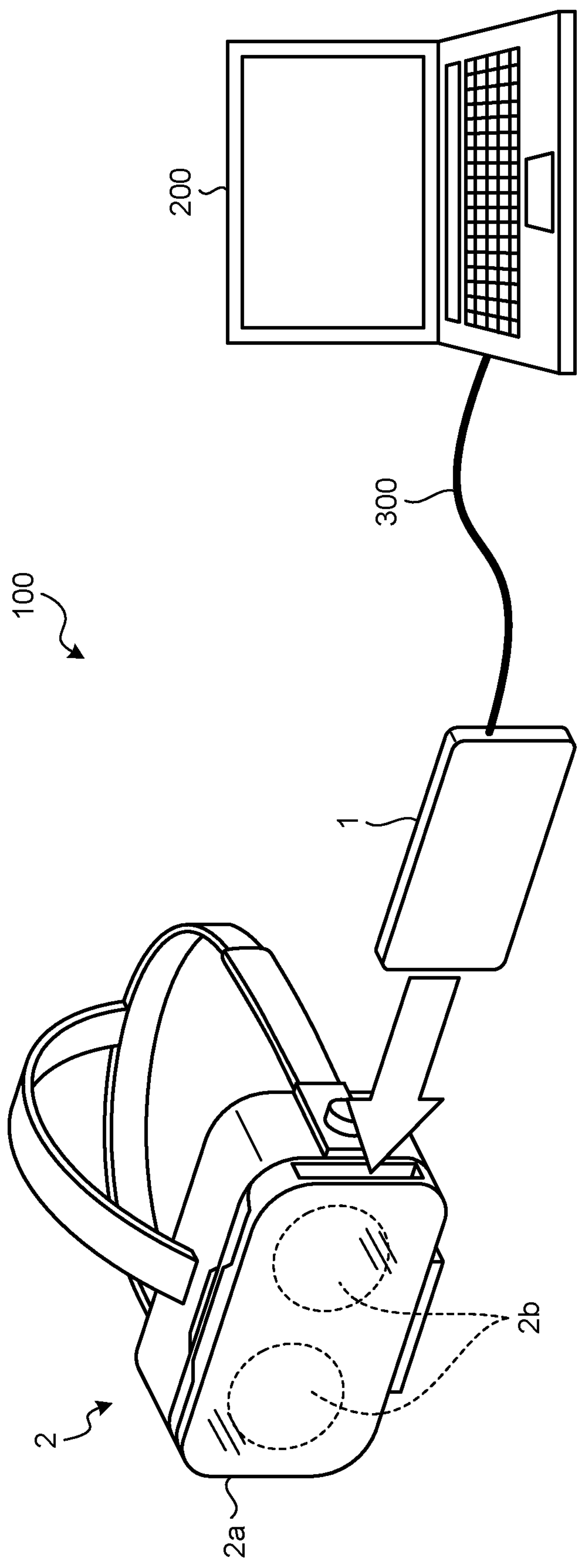
FIG. 1 is a configuration diagram of an example of a display system according to an embodiment of the present disclosure.

Exemplary embodiments of the present disclosure are described below with reference to the accompanying drawings. The contents described in the embodiments below are not intended to limit the present disclosure. Components described below include components easily conceivable by those skilled in the art and components substantially identical therewith. Furthermore, the components described below may be appropriately combined.

What is disclosed herein is given by way of example only, and appropriate modifications made without departing from the spirit of the present disclosure and easily conceivable by those skilled in the art naturally fall within the scope of the present disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

FIG. 1 is a configuration diagram of an example of a display system 100 according to an embodiment of the present disclosure. The display system 100 according to the present embodiment is a system that changes images in synchronization with a motion of the user. The display system 100 is, for example, a VR system that three-dimensionally displays images indicating three-dimensional objects or the like in a virtual space and changes the three-dimensional images according to the direction (position) of the user's head, thereby creating a sense of virtual reality for the user. Examples of the images include, but are not limited to, computer graphic video images, 360-degree real video images, etc.

The display system 100 is electrically coupled to an external device 200 by a cable 300. The external device 200 is an electronic apparatus, such as a personal computer and a gaming device. The external device 200 may be a server device on the Internet. The display system 100 and the external device 200 may be electrically coupled by wireless communications.

The external device 200 outputs image signals including information on an image to the display system 100. The image has two different images using the parallax of both eyes of the user. The two images are an image for the user's right eye and an image for the user's left eye.

The display system 100 includes a display device 1 and a mounting device 2. The mounting device 2 includes a mounting unit 2*a* and two lenses 2*b*.

The mounting unit 2*a* is mounted on the user's head in a manner covering both eyes of the user. Examples of the mounting unit 2*a* include, but are not limited to, headsets, goggles, helmets, masks, etc. The display device 1 is detachably attached to the mounting unit 2*a*. The display device 1 may be fixed to the mounting unit 2*a*. The mounting unit 2*a* may further include an output unit (not illustrated) that outputs sound signals output from the external device 200.

Figure 2:
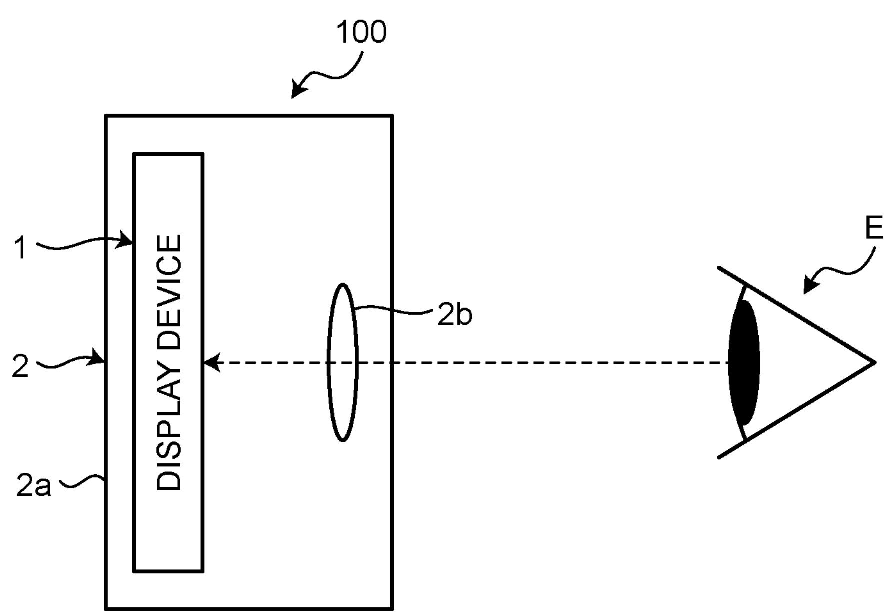
FIG. 2 is a schematic of an example of the positional relation between a display device and the user's eyes.

FIG. 2 is a schematic of an example of the positional relation between the display device 1 and the user's eyes E. The display device 1 is attached to the mounting unit 2*a* at such a position that a display region DA (which will be described later) for displaying images in the display device 1 faces the user's eyes E.

The two lenses 2*b* correspond to both eyes of the user. The lenses 2*b* are magnifying lenses to form an image displayed on the display device 1 in the user's eyes E. The lenses 2*b* are disposed between the display device 1 and the user's eyes E. The mounting device 2 may include three or more lenses 2*b*. In this case, the display device 1 may be attached at a position not facing the user's eyes E.

Figure 3:
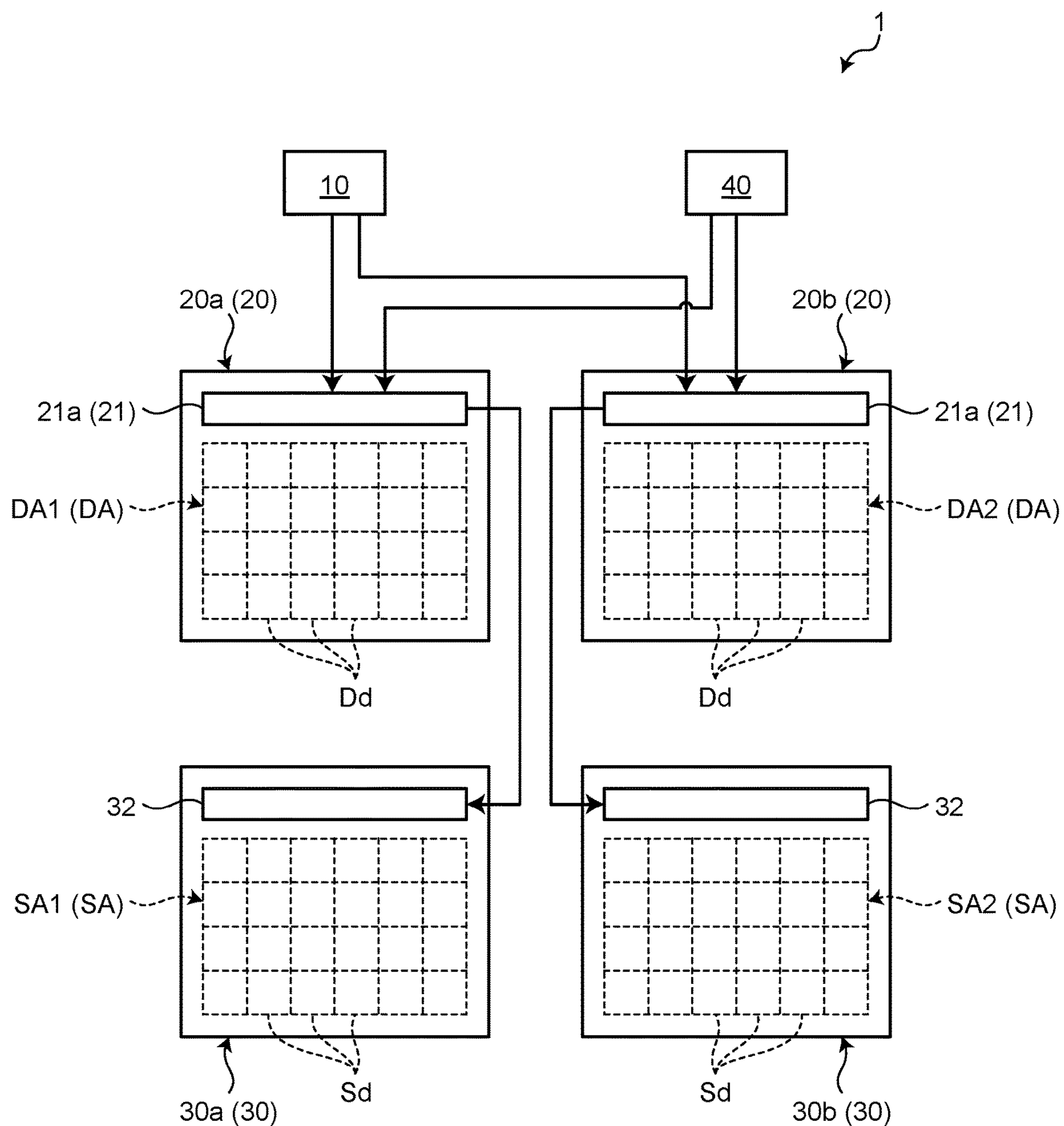
FIG. 3 is a block diagram of the display device.

FIG. 3 is a block diagram of the display device 1. The display device 1 includes an image separation circuit 10, a first display panel 20*a*, a second display panel 20*b*, a first light source device 30*a*, a second light source device 30*b*, and a sensor 40.

The image separation circuit 10 acquires image signals including information on an image from the external device 200. The image separation circuit 10 outputs image signals including information on an image for the right eye to the first display panel 20*a* and outputs image signals including information on an image for the left eye to the second display panel 20*b*.

The first display panel 20*a* and the second display panel 20*b* are transmissive liquid crystal displays. The first display panel 20*a* and the second display panel 20*b* may be organic or inorganic EL displays, for example. A first display region DA1 where an image is displayed on the first display panel 20*a* faces the user's left eye. A second display region DA2 where an image is displayed on the second display panel 20*b* faces the user's right eye.

The configuration of the first display panel 20*a* and that of the second display panel 20*b* are identical to each other. In the following description, the first display panel 20*a* and the second display panel 20*b* may be simply referred to as the display panel 20 when they are not distinguished from each other. The first display region DA1 and the second display region DA2 may be simply referred to as the display region DA when they are not distinguished from each other. The configuration of the first light source device 30*a* and that of the second light source device 30*b* are identical to each other. In the following description, the first light source device 30*a* and the second light source device 30*b* may be simply referred to as the light source device 30 when they are not distinguished from each other.

Figure 4:
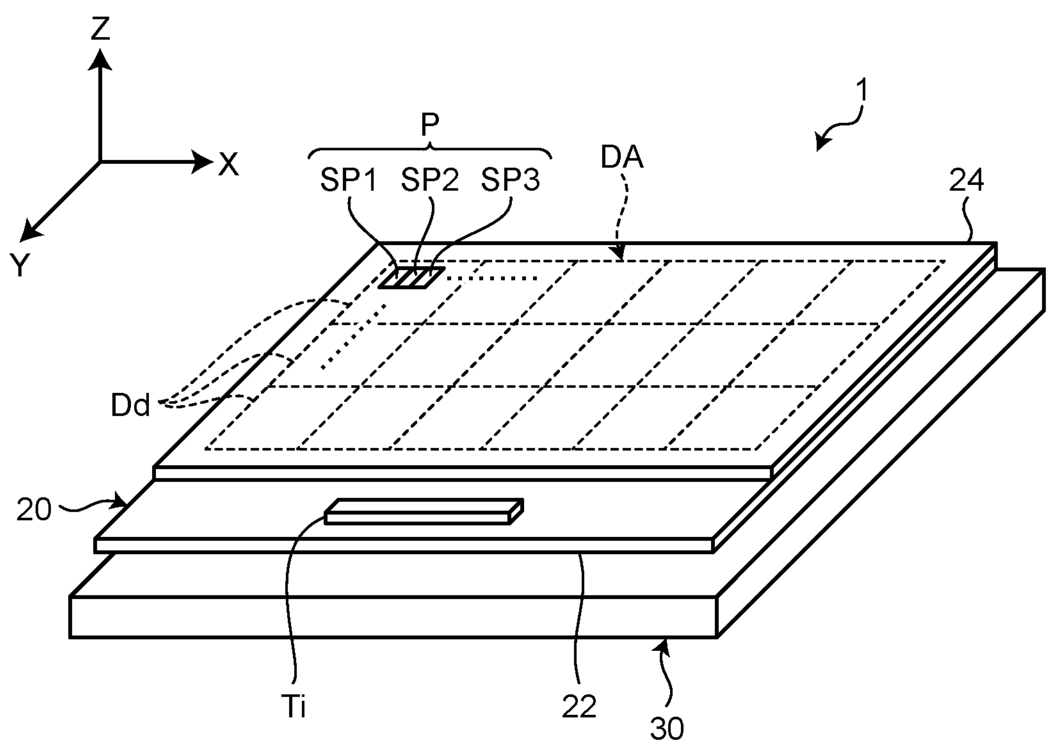
FIG. 4 is a perspective view of a display panel and a light source device.

FIG. 4 is a perspective view of the display panel 20 and the light source device 30. X- and Y-directions illustrated in the drawings correspond to the directions parallel to the front surface of a substrate included in the display panel 20. The +X and −X sides in the X-direction and the +Y and −Y sides in the Y-direction correspond to the sides of the display panel 20. A Z-direction corresponds to the thickness direction of the display panel 20 and is orthogonal to the X- and Y-directions. The +Z side in the Z-direction corresponds to the front surface side of the display panel 20, and the −Z side in the Z-direction corresponds to the back surface side of the display panel 20. In the present specification, "plan view" refers to viewing the display panel 20 from the +Z side to the −Z side along the Z-direction. The X-, Y-, and Z-directions are given by way of example only and are not intended to limit the present disclosure.

The display panel 20 is a rectangular plate in plan view and has the display region DA on the front surface. As illustrated in FIGS. 3 and 4, the display region DA is divided into a plurality of divided regions Dd arrayed in a matrix (row-column configuration) along the X- and Y-directions. As illustrated in FIG. 4, the display panel 20 includes a plurality of pixels P arrayed in a matrix (row-column configuration) along the X- and Y-directions in the display region DA. One divided region Dd includes a plurality of pixels P.

The pixels P each include a first sub-pixel SP1, a second sub-pixel SP2, and a third sub-pixel SP3. The first sub-pixel SP1 is a red sub-pixel SP. The second sub-pixel SP2 is a green sub-pixel SP. The third sub-pixel SP3 is a blue sub-pixel SP. The first sub-pixel SP1, the second sub-pixel SP2, and the third sub-pixel SP3 are arrayed in this order along the X-direction. The array of the first sub-pixel SP1, the second sub-pixel SP2, and the third sub-pixel SP3 is what is called a stripe array.

In the following description, the first sub-pixel SP1, the second sub-pixel SP2, and the third sub-pixel SP3 may be simply referred to as the sub-pixel SP when they are not distinguished from one another. Needless to say, the array of the sub-pixels SP is not limited to the stripe array, and the colors of the sub-pixels SP are not limited to the colors described above.

Figure 5:
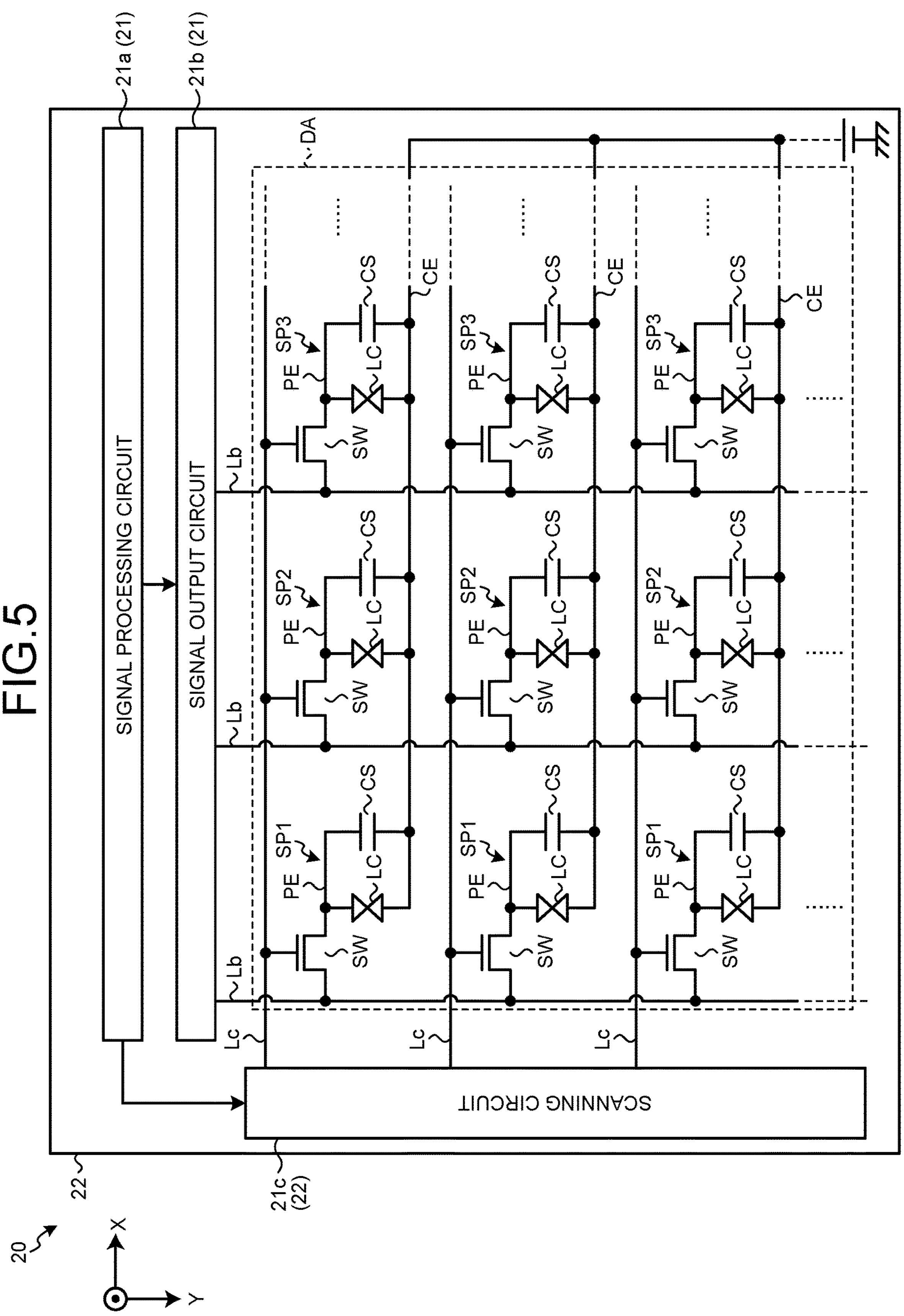
FIG. 5 is a diagram of a circuit configuration of the display panel.

FIG. 5 is a diagram of a circuit configuration of the display panel 20. The display panel 20 includes a drive circuit 21, and a switching element SW, a sub-pixel electrode PE, a common electrode CE, liquid crystal capacitance LC, and holding capacitance KC included in each of the sub-pixels SP.

The drive circuit 21 drives the display panel 20 based on the image signals. The drive circuit 21 includes a signal processing circuit 21*a*, a signal output circuit 21*b*, and a scanning circuit 21*c*.

The signal processing circuit 21*a* generates sub-pixel signals, which will be described later, based on the image signals output from the image separation circuit 10 and outputs the generated sub-pixel signals to the signal output circuit 21*b*. The signal processing circuit 21*a* outputs clock signals for synchronizing the operation of the signal output circuit 21*b* with the operation of the scanning circuit 21*c* to the signal output circuit 21*b* and the scanning circuit 21*c*.

The signal output circuit 21*b* outputs the sub-pixel signals to the respective sub-pixels SP. The signal output circuit 21*b* and the sub-pixels SP are electrically coupled via a plurality of signal lines Lb extending along the Y-direction.

The scanning circuit 21*c* scans a plurality of sub-pixels SP in synchronization with the output of the sub-pixel signals by the signal output circuit 21*b*. The scanning circuit 21*c* and the sub-pixels SP are electrically coupled via a plurality of scanning lines Lc extending along the X-direction. The area partitioned by two signal lines Lb adjacent to each other in the X-direction and two scanning lines Lc adjacent to each other in the Y-direction in plan view corresponds to the sub-pixel SP.

The switching element SW is composed of a thin-film transistor (TFT), for example. In the switching element SW, the source electrode is electrically coupled to the signal line Lb, and the gate electrode is electrically coupled to the scanning line Lc.

The sub-pixel electrode PE is coupled to the drain electrode of the switching element SW. A plurality of common electrodes CE are disposed corresponding to the respective scanning lines Lc. The sub-pixel electrode PE and the common electrode CE are translucent.

The liquid crystal capacitance LC is a capacitance component of the liquid crystal material of a liquid crystal layer 23, which will be described later, between the sub-pixel electrode PE and the common electrode CE. The holding capacitance KC is provided between the electrode with the same potential as the common electrode CE and the electrode with the same potential as the sub-pixel electrode PE.

Figure 6:
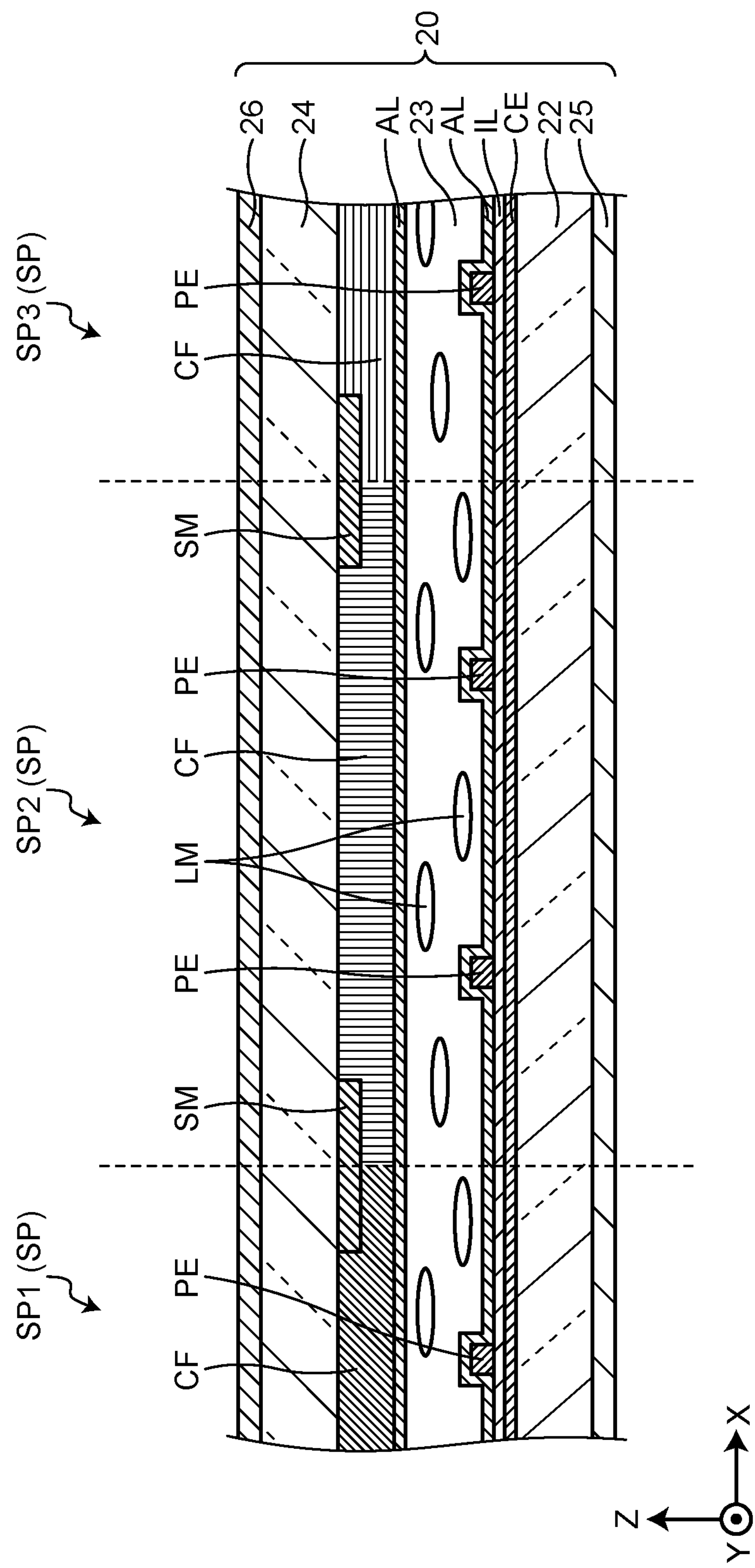
FIG. 6 is a sectional view of the display panel.

FIG. 6 is a sectional view of the display panel 20. The display panel 20 further includes a first substrate 22, the liquid crystal layer 23, and a second substrate 24. The first substrate 22, the liquid crystal layer 23, and the second substrate 24 are translucent and are disposed in this order from the −Z side to the +Z side along the Z-direction. The first substrate 22 and the second substrate 24 have a rectangular shape in plan view.

An IC chip Ti constituting the drive circuit 21 is disposed on the front surface of the first substrate 22 (refer to FIG. 4). The common electrode CE is disposed on the front surface of the first substrate 22. An insulating layer IL is disposed on the front surface of the common electrode CE. The sub-pixel electrodes PE and an orientation film AL are disposed on the front surface of the insulating layer IL.

The sub-pixel electrodes PE are disposed between the insulating layer IL and the orientation film AL. Thus, the common electrode CE and the sub-pixel electrodes PE are disposed on the first substrate 22. In other words, the display panel 20 is a lateral electric field liquid crystal display.

The second substrate 24 is positioned on the front surface side of the first substrate 22. Color filters CF, a light-shielding film SM, and an orientation film AL are positioned on the back surface of the second substrate 24. The light-shielding film SM and the color filters CF are disposed between the second substrate 24 and the orientation film AL.

The color filter CF has a rectangular shape in plan view, and one color filter CF is disposed corresponding to one sub-pixel SP. The color filter CF is translucent, and the peak of the spectrum of light to be transmitted through the color filter CF is determined in advance. The peak of the spectrum corresponds to the color of the color filter CF. The color of the color filter CF is the same as that of the sub-pixel SP. In other words, the red first sub-pixel SP1 includes a red color filter CF, the green second sub-pixel SP2 includes a green color filter CF, and the blue third sub-pixel SP3 includes a blue color filter CF.

The light-shielding film SM has a light-shielding property and overlaps in plan view with the boundaries of the sub-pixels SP adjacent to each other in the X- and Y-directions. In FIG. 6, the signal lines Lb and the scanning lines Lc are not illustrated. The signal lines Lb and the scanning lines Lc are disposed on the front surface of the first substrate 22.

The liquid crystal layer 23 includes a plurality of liquid crystal molecules LM. The liquid crystal layer 23 is provided between the first substrate 22 and the second substrate 24 and overlaps the display region DA in plan view. Specifically, the liquid crystal layer 23 is provided between the two orientation films AL facing each other. The orientation of the liquid crystal molecules LM is regulated by the two orientation films AL facing each other.

The display panel 20 further includes a first polarizing plate 25 disposed on the back surface of the first substrate 22 and a second polarizing plate 26 disposed on the front surface of the second substrate 24. The first polarizing plate 25 has a transmission axis orthogonal to the Z-direction. The second polarizing plate 26 has a transmission axis orthogonal to the transmission axis of the first polarizing plate 25 and the Z-direction. The front surface of the second polarizing plate 26 corresponds to the front surface of the display panel 20. The back surface of the first polarizing plate 25 corresponds to the back surface of the display panel 20.

When the drive circuit 21 outputs the sub-pixel signals to the sub-pixels SP based on the image signals, an electric field is generated in the liquid crystal layer 23, and the orientation of the liquid crystal molecules LM changes. As a result, the light transmitted through the display panel 20 is modulated, whereby an image is displayed in the display region DA (details will be described later). Thus, the sub-pixels SP included in the pixel P constitute an image.

As illustrated in FIG. 4, the light source device 30 is disposed on the back surface side of the display panel 20. Specifically, the first light source device 30*a* is disposed on the back surface side of the first display panel 20*a*, and the second light source device 30*b* is disposed on the back surface side of the second display panel 20*b*.

As illustrated in FIG. 3, the first light source device 30*a* has a first emission region SA1 for emitting light toward the first display panel 20*a* on the front surface, and the second light source device 30*b* has a second emission region SA2 for emitting light toward the second display panel 20*b*. The first emission region SA1 overlaps the first display region DA1 in plan view, and the second emission region SA2 overlaps the second display region DA2 in plan view. In the following description, the first emission region SA1 and the second emission region SA2 may be simply referred to as the emission region SA when they are not distinguished from each other.

Figure 7:
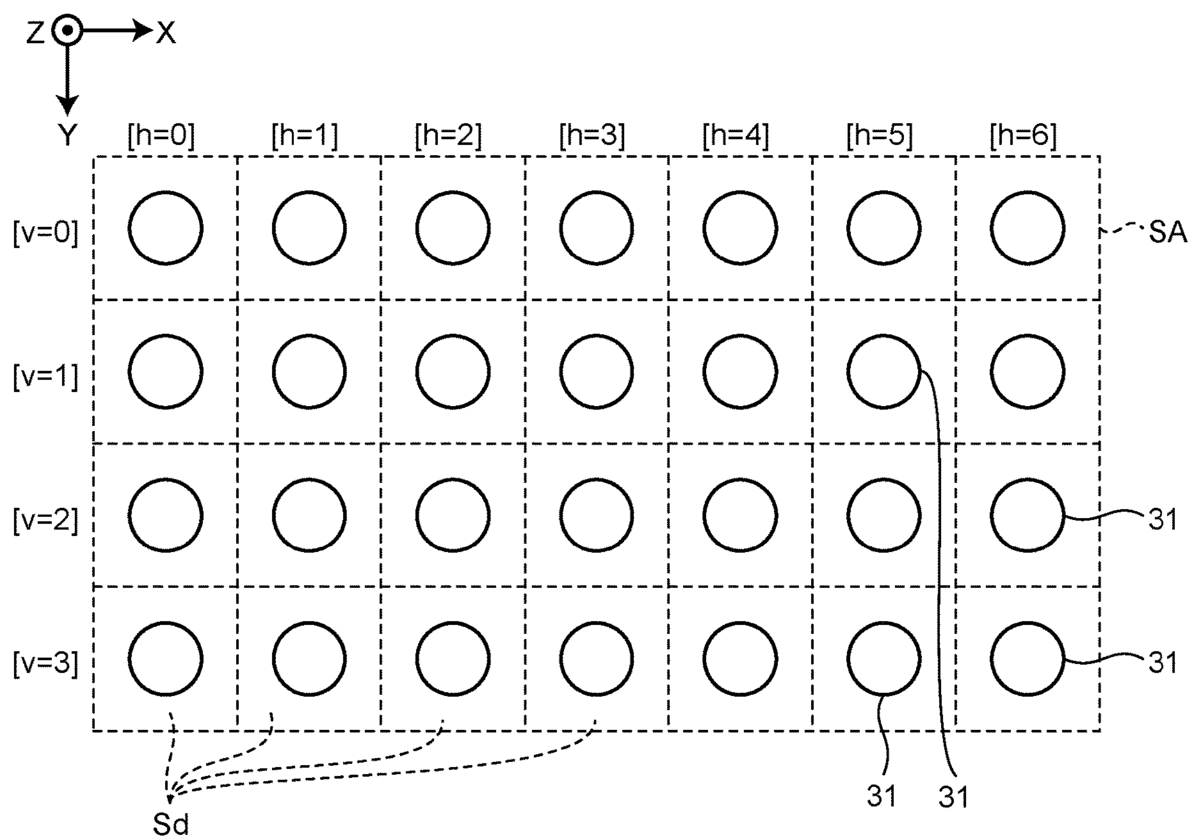
FIG. 7 is a plan view of the configuration of the light source device.

FIG. 7 is a plan view of the configuration of the light source device 30. The emission region SA has a plurality of segmented regions Sd arrayed in a matrix (row-column configuration) along the X- and Y-directions. The segmented regions Sd each have a square shape and have the same size. The number of segmented regions Sd according to the present embodiment is 28.

The number of rows of the segmented regions Sd is 4. The variable indicating the row number of the segmented regions Sd is set to "v", and the row number of the segmented regions Sd positioned on the most −Y side is set to 0 (i.e., v=0). The row number is set to increment by 1 from the −Y side toward the +Y side.

The number of columns of the segmented regions Sd arrayed along the X-direction is 7. The variable indicating the column number of the segmented regions Sd is set to "h", and the column number of the segmented regions Sd positioned on the most −X side is set to 0 (i.e., h=0). The row number is set to increment by 1 from the −X side toward the +X side.

The light source device 30 includes a plurality of light sources 31 that emit light toward the display panel 20. The light sources 31 are light-emitting diodes (LED) of the same color (e.g., white). The light sources 31 are disposed corresponding to the respective segmented regions Sd. In the configuration according to the present embodiment, one light source 31 is disposed in one segmented region Sd. Needless to say, the number of light sources 31 disposed in one segmented region Sd is not limited to one.

Figure 8:
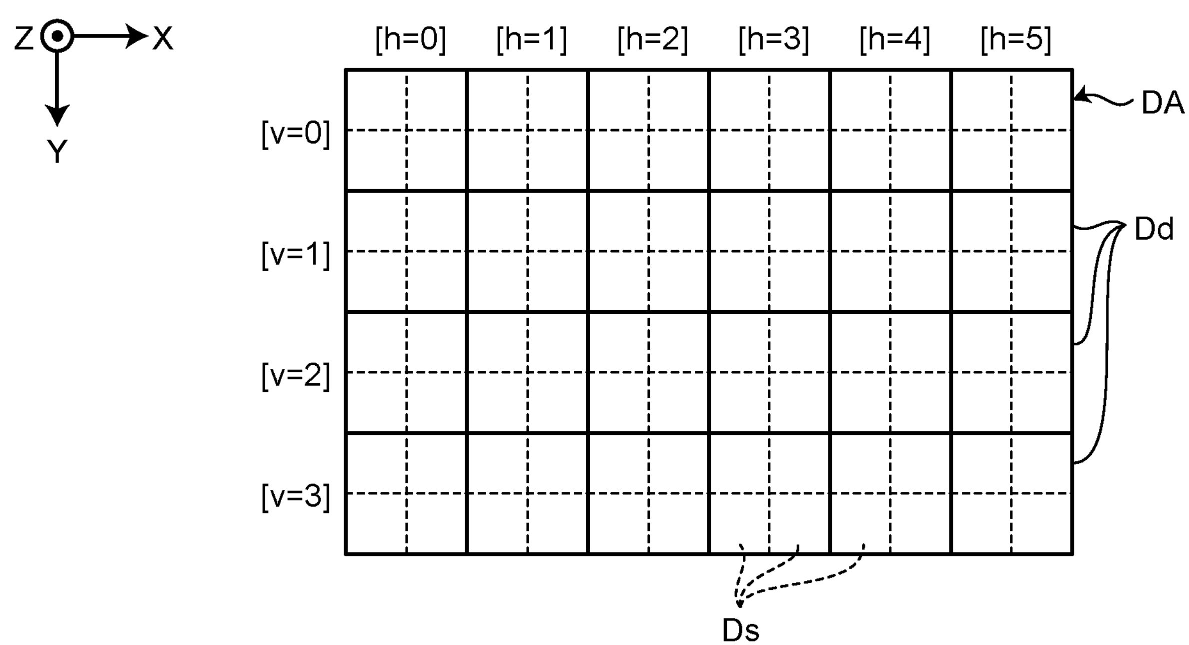
FIG. 8 is a plan view of a display region.

FIG. 8 is a plan view of the display region DA. The divided region Dd overlaps the segmented region Sd in plan view. In other words, the divided regions Dd each have a square shape and have a size equal to that of the segmented region Sd. Therefore, the number of divided regions Dd according to the present embodiment is 28, which is equal to the number of divided regions Sd.

The number of rows of the divided regions Dd is 4, which is equal to the number of rows of the segmented regions Sd. In the same manner as in the segmented regions Sd, the variable indicating the row number of the divided regions Dd is set to "v". The number of columns of the divided regions Dd is 7, which is equal to the number of columns of the segmented regions Sd. In the same manner as in the segmented regions Sd, the variable indicating the row number of the divided regions Dd is set to "h".

The divided regions Dd each have a plurality of small divided regions Ds. The small divided regions Ds are obtained by dividing the divided region Dd into a plurality of sections. The small divided regions Ds each have a rectangular shape in plan view and are arrayed in a matrix (row-column configuration) along the X- and Y-directions. In one divided region Dd according to the present embodiment, the number of small divided regions Ds is 4, the number of rows of the small divided regions Ds arrayed along the X-direction is 2, and the number of columns of small divided regions Ds arrayed along the Y-direction is 2. The small divided regions Ds each include a plurality of pixels P. Needless to say, the arrangement and the number of segmented regions Sd, divided regions Dd, and small divided regions Ds are not limited to those described above.

As described above, the divided region Dd overlaps the segmented region Sd in plan view. In other words, the light sources 31 are disposed corresponding to the respective divided regions Dd.

Figure 9:
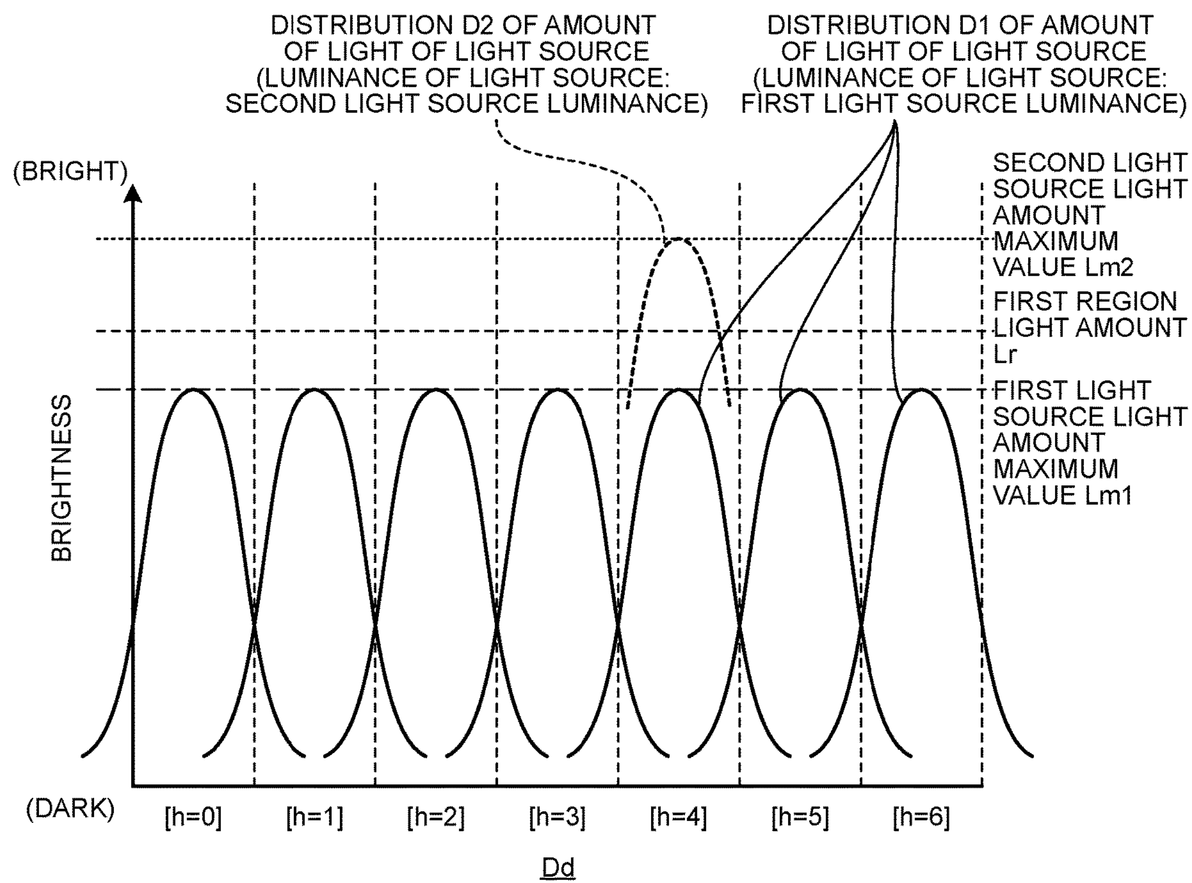
FIG. 9 is a diagram of the relation between the amount of light of a light source and the amount of light of a divided region in divided regions of any row number.

FIG. 9 is a diagram of the relation between the amount of light of the light source 31 and the amount of light of the divided region Dd in the divided regions Dd of any row number. In FIG. 9, the vertical axis indicates the brightness, and the horizontal axis indicates the column number of the divided regions Dd of any row number. In other words, the horizontal axis in FIG. 9 one-dimensionally indicates the divided regions Dd of any row number. While the following describes the one-dimensional arrangement of the divided regions Dd, the divided regions Dd are two-dimensionally arranged along the X- and Y-directions as described above, and the following description is also applicable to the two-dimensional arrangement.

The amount of light of the light source 31 is the amount of light emitted from the light source 31. The amount of light of the light source 31 increases as the luminance of the light source 31 corresponding to the brightness of the outer surface of the light emitter (not illustrated) of the light source 31 increases. The luminance of the light source 31 can be adjusted from 0 (zero) to first light source luminance. The first light source luminance is the luminance of the light source 31 corresponding to a first current value (approximately 50% of a rated current value) smaller than the rated current value of the light source 31. In FIG. 9, distribution D1 of the amount of light of the light source 31 when the luminance of the light source 31 is the first light source luminance is indicated by the solid line for each of the light sources 31.

As illustrated in FIG. 9, the distribution of the amount of light of the light source 31 corresponding to a certain divided region Dd extends not only to the certain divided region Dd but also to the divided regions Dd adjacent to the certain divided region Dd. This indicates that the light of the light source 31 corresponding to a certain divided region Dd is incident not only on the certain divided region Dd but also on the divided regions Dd adjacent to the certain divided region Dd. In other words, the lights of a plurality of light sources 31 are synthesized in each of the divided regions Dd. The total amount of light of a plurality of light sources 31 incident on the divided region Dd corresponds to the amount of light of the divided region Dd.

If the luminance of all the light sources 31 is the first light source luminance, the lights of the light sources 31 are synthesized, and the amount of light of the divided region Dd in each of the divided regions Dd is a first region light amount Lr. The first region light amount Lr is larger than the first light source light amount maximum value Lm1, which is the maximum value of the amount of light of the light source 31 corresponding to the first light source luminance.

The luminance of the light source 31 can be adjusted to second light source luminance higher than the first light source luminance. The second light source luminance is the luminance of the light source 31 corresponding to a second current value (approximately 80% of the rated current value) larger than the first current value and equal to or smaller than the rated current value of the light source 31. In FIG. 9, distribution D2 of the amount of light of the light source 31 when the luminance of the light source 31 is the second light source luminance is indicated by the dashed line. If the luminance of the light source 31 is the second light source luminance, a second light source light amount maximum value Lm2, which is the maximum value of the amount of light of the light source 31, is larger than the first region light amount Lr. The luminance of the light source 31 is usually adjusted to the first light source luminance or lower. Thus, deterioration of the light source 31 can be suppressed.

As illustrated in FIG. 3, the light source device 30 further includes a light source control circuit 32. The signal processing circuit 21*a* (refer to FIG. 4) of the drive circuit 21 described above generates light source signals, which will be described later, based on the image signals output from the image separation circuit 10 and outputs the generated light source signals to the light source control circuit 32 (details will be described later). The signal processing circuit 21*a* also outputs the clock signals described above to the light source control circuit 32. The clock signal synchronizes the operation of the light source control circuit 32, the operation of the signal output circuit 21*b*, and the operation of the scanning circuit 21*c*. The light source control circuit 32 adjusts the luminance of the light source 31 based on the light source signals.

The sensor 40 detects the movement of the display panel 20. The sensor 40 is provided to one of the first display panel 20*a* and the second display panel 20*b*. The sensor 40 may be provided to the mounting unit 2*a*.

The sensor 40 is an acceleration sensor. The sensor 40 is a capacitive acceleration sensor, for example. The sensor 40 detects the acceleration of the display panel 20 caused by the movement of the display panel 20. The sensor 40 also detects the direction of the display panel 20 (specifically, the inclination angle of the front surface of the display panel 20 with respect to the horizontal direction). The detection values of the sensor 40 are output to the signal processing circuit 21*a*. The sensor 40 may include a gyro sensor. If the sensor 40 includes a gyro sensor, the sensor 40 also detects the angular velocity of the display panel 20 caused by the movement of the display panel 20 and can detect the acceleration of the display panel 20 with higher accuracy.

The following describes an outline of the operation of the display device 1 performed to display an image in the display region DA when the mounting unit 2*a* provided with the display panel 20 is mounted on the user's head.

The image separation circuit 10 acquires the image signals output from the external device 200 and outputs them to the display panel 20. The signal processing circuit 21*a* acquires the detection signals from the sensor 40 and calculates the direction of the display panel 20. Based on the direction of the display panel 20, the signal processing circuit 21*a* specifies information on a partial image (hereinafter referred to as a display image) to be displayed in the display region DA out of information on an image (hereinafter referred to as an input image) included in the image signals. In other words, the display image that is part of the input image is displayed in the display region DA, and the display image is specified by the direction of the display panel 20.

Figure 10:
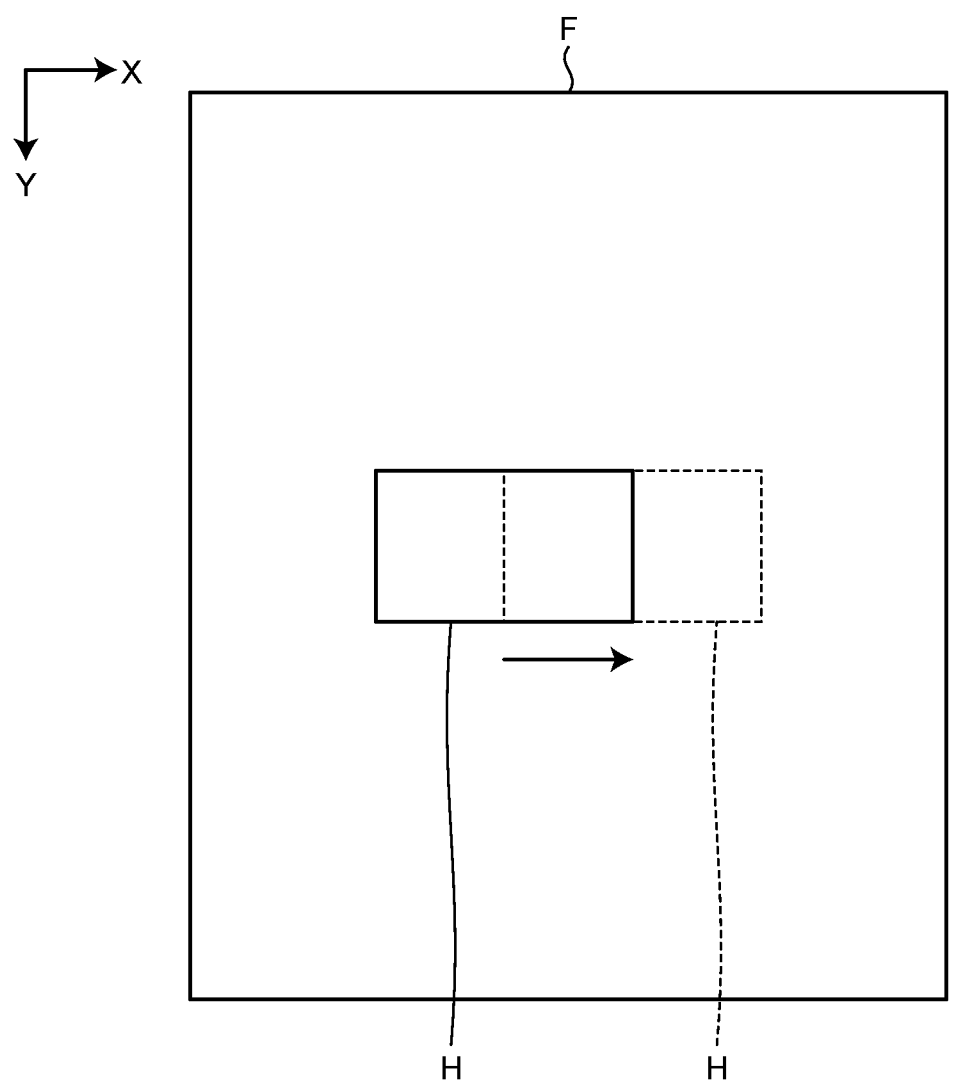
FIG. 10 is a diagram of the relation between an input image and a display image.

FIG. 10 is a diagram of the relation between an input image F and a display image. The X- and Y-directions illustrated in FIG. 10 correspond to the X- and Y-directions of the display panel 20. The display image corresponds to an image selected by a selection range H in the input image F. The selection range H has a rectangular shape, and the ratio of the length of the selection range H in the X-direction to that in the Y-direction corresponds to the ratio of the length of the display region DA in the X-direction to that in the Y-direction.

For example, let us assume a case where the user is facing the front, and the front surface of the display panel 20 is orthogonal to the horizontal direction. In this case, the selection range H (indicated by the solid line in FIG. 10) is positioned at the center of the input image F, and the information on the input image F surrounded by the selection range H is specified as the information on the display image.

The signal processing circuit 21*a* generates the light source signals and the sub-pixel signals described above based on the information on the display image included in the image signals. The information on the display image according to the present embodiment includes the gradation of the sub-pixel SP. The signal processing circuit 21*a* calculates the luminance of the sub-pixel SP based on the information on the display image. The luminance of the sub-pixel SP is calculated to be higher as the gradation of the sub-pixel SP is larger. The correlation between the gradation of the sub-pixel SP and the luminance of the sub-pixel SP is derived through experiments, simulations, and the like performed in advance and is stored in a storage unit (not illustrated) of the drive circuit 21.

The signal processing circuit 21*a* calculates the luminance (actual luminance, which will be described later) of the light source 31 based on the calculated luminance of the sub-pixel SP (details will be described later). The signal processing circuit 21*a* also calculates the voltage to be applied to the light source 31 based on the calculated luminance (actual luminance) of the light source 31.

The light source signal includes the calculated voltage to be applied to the light source 31 and is output from the signal processing circuit 21*a* to the light source 31 via the light source control circuit 32. The light source 31 emits light with the luminance corresponding to the value of the voltage included in the light source signal and emits light toward the display panel 20. The luminance of the light source 31 and the amount of light of the light source 31 incident on the display panel 20 increase as the value of the voltage included in the light source signal increases.

The signal processing circuit 21*a* calculates the transmittance of the sub-pixel SP (=Luminance of Sub-pixel SP/Luminance (Actual Luminance) of Light Source 31) using the calculated luminance of the sub-pixel SP and the luminance (actual luminance) of the light source 31. The signal processing circuit 21*a* also calculates the voltage to be applied to the sub-pixel electrode PE from the calculated transmittance of the sub-pixel SP.

The sub-pixel signal includes the voltage to be applied to the sub-pixel electrode PE and is output from the signal processing circuit 21*a* to the sub-pixel SP via the signal output circuit 21*b* and the scanning circuit 21*c*. As a result, an electric field corresponding to the value of the voltage included in the sub-pixel signal is generated in the liquid crystal layer 23, and the orientation of the liquid crystal molecules LM changes. The inclination of the liquid crystal molecules LM increases, and the transmittance increases as the value of the voltage included in the sub-pixel signal increases.

As a result, the light of the light source 31 transmitted through the display panel 20 is modulated in each of the sub-pixels SP, whereby the display image is displayed in the display region DA. The luminance of each of the sub-pixels SP corresponds to the luminance of the sub-pixel SP calculated by the signal processing circuit 21*a*.

If the display panel 20 is moved by a motion of the user's head, the position and the direction of the display panel 20 change. In this case, the signal processing circuit 21*a* calculates the amount of movement of the display panel 20 based on the detection value of the sensor 40.

The amount of movement of the display panel 20 includes the amount of change in the position of the display panel 20 in spatial coordinates and the amount of change in the direction of the display panel 20 (specifically, the angle of the front surface of the display panel 20 with respect to the horizontal direction). The correlation between the detection value of the sensor 40 and the amount of movement of the display panel 20 is derived through experiments, simulations, and the like performed in advance and is stored in the storage unit of the drive circuit 21.

The signal processing circuit 21*a* specifies the information on the display image based on the calculated amount of movement of the display panel 20. For example, if the user's head turns by the user's turning to the right from the state where the user is facing the front and the center of the input image F is displayed in the display region DA as the display image, the display panel 20 moves from the front of the user to the right (+X side).

In this case, the signal processing circuit 21*a* moves the selection range H indicated by the solid line in the input image F from the center of the input image F to the +X side as indicated by the arrow in FIG. 10. The selection range H after the movement is indicated by the dashed line. The correlation between the amount of movement of the display panel 20 and the amount of movement of the selection range H is derived through experiments, simulations, and the like performed in advance and is stored in the storage unit of the drive circuit 21.

By such a motion of the user's head, the image at the center in the input image F to part of the image on the right of the center are continuously switched and displayed in the display region DA depending on the movement of the display panel 20. In other words, when the user turns from the front to the right, the display image in the display region DA continuously switches in a manner moving from the +X side to the −X side. Specifically, the image on the +X side of the display image in the display region DA moves to the −X side in the display region DA. In other words, the movement of the display panel 20 causes part of the image displayed in the display region DA to move in the display region DA.

The following describes in detail the operation of the display device 1 when the drive circuit 21 (signal processing circuit 21*a*) calculates the luminance (actual luminance) of the light source 31.

Figure 11:
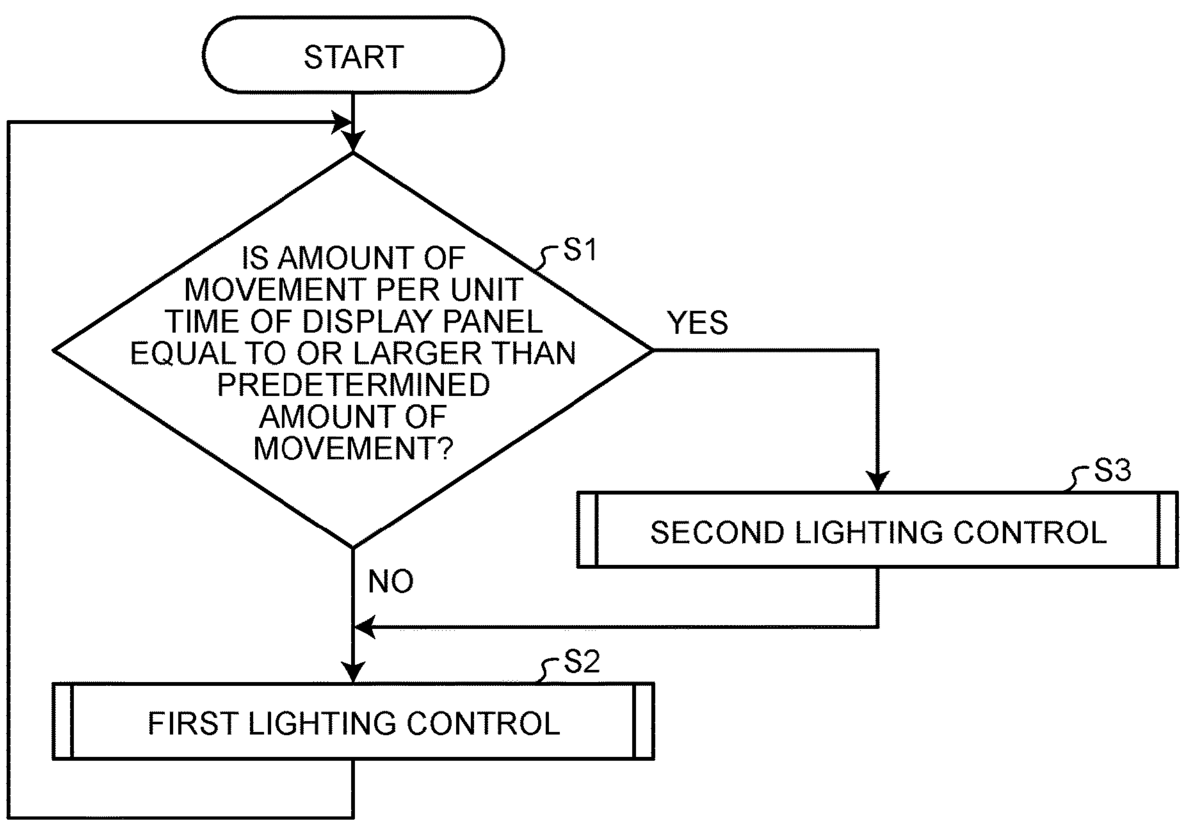
FIG. 11 is a flowchart executed by a drive circuit to calculate the luminance of the light source.

FIG. 11 is a flowchart executed by the drive circuit 21 to calculate the luminance of the light source 31. At Step S1, the drive circuit 21 determines whether the amount of movement per unit time of the display panel 20 is equal to or larger than a predetermined amount of movement. The unit time corresponds to the time of one frame for displaying the display image.

The predetermined amount of movement is the amount of movement per unit time of the display panel 20 in which the amount of movement per unit time of part of the image displayed in the display region DA is equal to or larger than the size of the divided region Dd due to the movement of the display panel 20. The size of the divided region Dd is the length of one side of the divided region Dd (i.e., the length of the divided region Dd in the X-direction (or the length of the divided region Dd in the Y-direction)). The size of the divided region Dd is equal to that of the segmented region Sd.

If the amount of movement per unit time of the display panel 20 is smaller than the predetermined amount of movement due to a relatively small motion of the user's head (No at Step S1), the drive circuit 21 performs first lighting control at Step S2. The first lighting control is control performed by the drive circuit 21 to adjust the luminance of the light source 31 for each of the light sources 31 based on the image signals. In other words, the first lighting control is control for performing what is called local dimming. In the first lighting control, the drive circuit 21 sets the luminance of the light source 31 to 0 or higher. In other words, in the first lighting control, the state of the light source 31 includes a state where the luminance of the light source 31 is 0, that is, the light source 31 is turned off.

Figure 12:
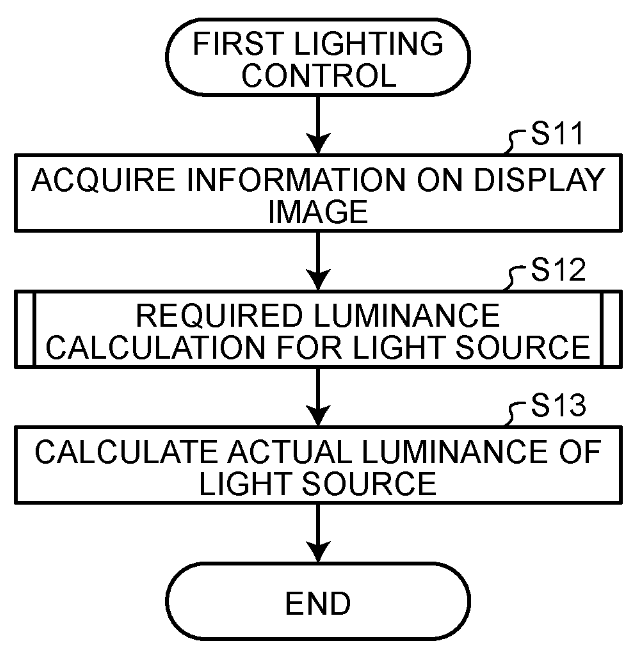
FIG. 12 is a flowchart of first lighting control performed by the drive circuit.

FIG. 12 is a flowchart of the first lighting control performed by the drive circuit 21. At Step S11, the drive circuit 21 acquires information on the display image included in the image signals. Subsequently, the drive circuit 21 performs required luminance calculation for the light source 31 at Step S12.

Figure 13:
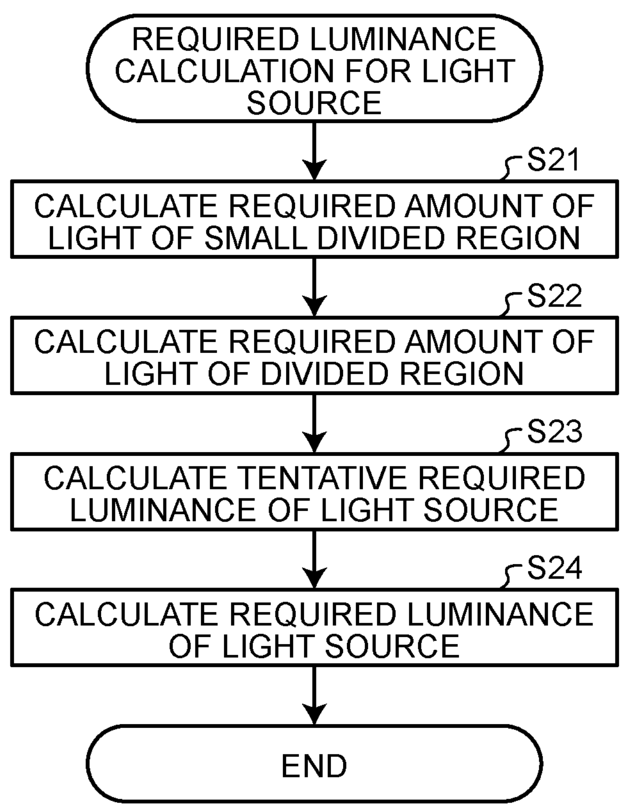
FIG. 13 is a flowchart of required luminance calculation for the light source illustrated in FIG. 12.

FIG. 13 is a flowchart of the required luminance calculation for the light source 31 illustrated in FIG. 12. The drive circuit 21 calculates the required amount of light of the small divided region Ds at Step S21.

The required amount of light of the small divided region Ds is the amount of light of the small divided region Ds required to obtain the luminance of the sub-pixels SP included in the small divided region Ds. The required luminance of the divided region Dd is calculated for each of the divided regions Dd based on the luminance of the sub-pixels SP included in the small divided region Ds.

The luminance of the sub-pixel SP is calculated based on the gradation of the sub-pixel SP included in the information on the display image obtained by the drive circuit 21 at Step S12 as described above. The luminance of the sub-pixel SP corresponding to the maximum value of the gradation of the sub-pixel SP according to the present embodiment is equal to the first region light amount Lr (refer to FIG. 9). If the gradation of the sub-pixel SP is the maximum value, for example, the luminance of the sub-pixel SP is the first region light amount Lr by setting the required amount of light of the small divided region Ds corresponding to the sub-pixel SP to the first region light amount Lr and setting the transmittance of the sub-pixel SP to 100%.

In the first lighting control, the drive circuit 21 specifies the sub-pixel SP with the highest luminance out of the luminance of the sub-pixels SP included in the small divided region Ds, and the required amount of light of the small divided region Ds is calculated to be smaller as the luminance of the specified sub-pixel SP is lower. Thus, the luminance of the light source 31 that irradiates the small divided region Ds including the specified sub-pixel SP is lower as the luminance of the sub-pixel SP is lower. As a result, leakage of light (hereinafter referred to as light leakage) between two sub-pixels SP adjacent to each other is suppressed in a region where the luminance of the sub-pixel SP is relatively low in the display region DA. Therefore, the contrast of the display image is improved. The correlation between the luminance of the sub-pixel SP and the required amount of light of the small divided region Ds is derived through experiments, simulations, and the like performed in advance and is stored in the storage unit of the drive circuit 21.

Subsequently, the drive circuit 21 calculates the required amount of light of the divided region Dd at Step S22. The required amount of light of the divided region Dd is the largest required amount of light out of the required amounts of light of the small divided regions Ds included in the divided region Dd. Thus, the drive circuit 21 calculates the required amount of light, which is the amount of light of the divided region Dd required for each of the divided regions Dd based on the image signals.

Figure 14:
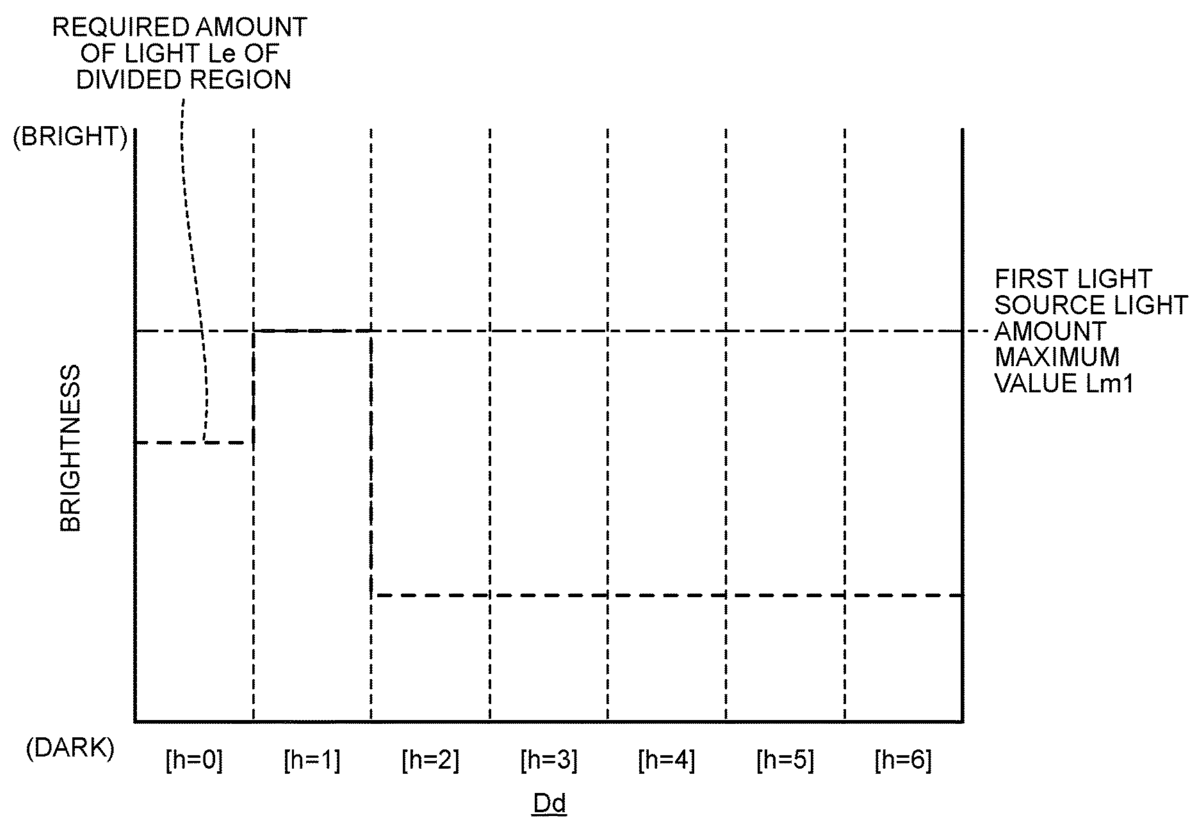
FIG. 14 is a diagram of the required amount of light of the divided region in the divided regions of any row number.

FIG. 14 is a diagram of the required amount of light of the divided region Dd in the divided regions Dd of any row number. The vertical and horizontal axes in FIG. 14 are the same as those in FIG. 9. FIG. 14 illustrates a required amount of light Le of the divided region Dd calculated by the drive circuit 21.

To simplify the explanation, the following describes the required amount of light Le of the divided region Dd calculated by the drive circuit 21 at Step S22 (refer to FIG. 13) in the following case: the required amount of light Le of the divided region Dd in the [h=1]-th column is equal to the first light source light amount maximum value Lm1, the required amount of light Le of the divided region Dd decreases in the order of the [h=1]-th column, the [h=0]-th column, and the [h=2]-th column, and the amounts of light Le of the divided region Dd in the [h=2]-th, [h=3]-th, [h=4]-th, [h=5]-th, and [h=6]-th columns are equal to each other as illustrated in FIG. 14.

The drive circuit 21 calculates tentative required luminance of the light source 31 at Step S23 illustrated in FIG. 13. The tentative required luminance of the light source 31 (which may be hereinafter simply referred to as the tentative required luminance) is the luminance of the light source 31 at which the maximum value of the amount of light of the light source 31 is slightly smaller than the required amount of light Le of the divided region Dd in each of the divided regions Dd. The correlation between the tentative required luminance and the required amount of light of the divided region Dd is derived through experiments, simulations, and the like performed in advance and is stored in the storage unit of the drive circuit 21.

Figure 15:
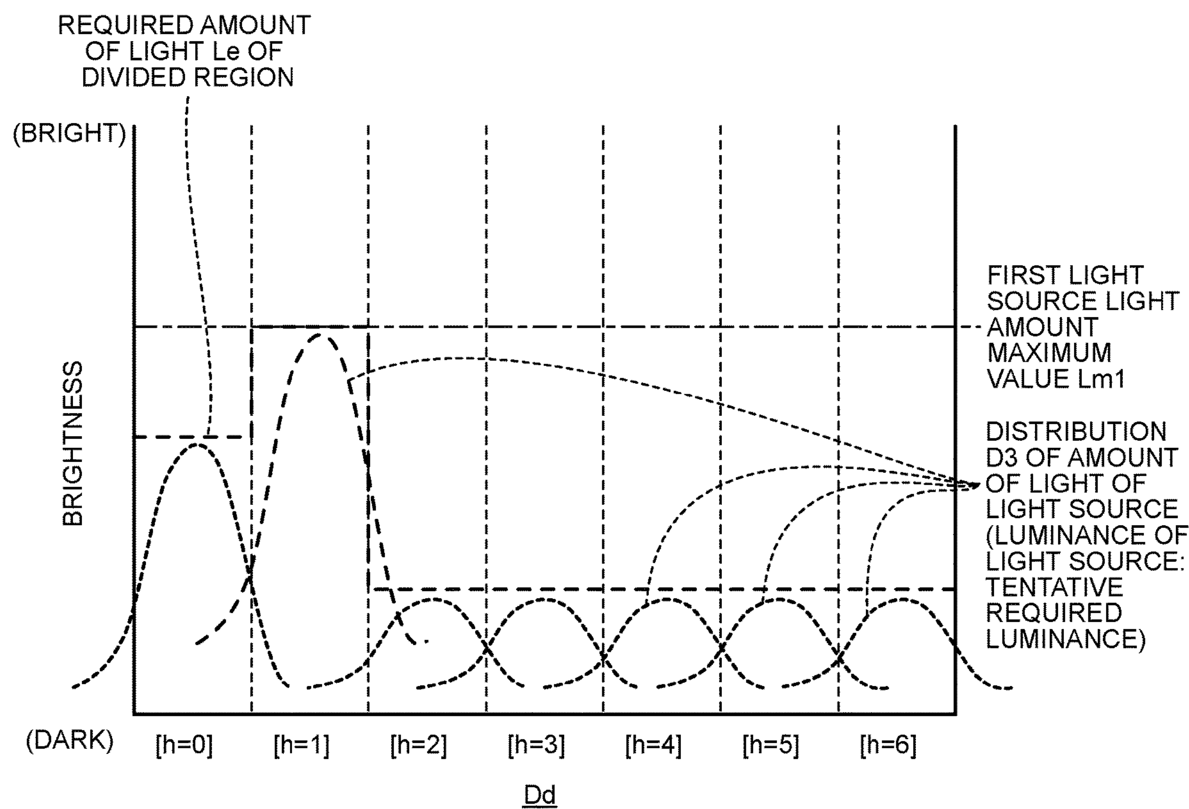
FIG. 15 is a diagram of the distribution of the amount of light of the light source corresponding to tentative required luminance in the divided regions of any row number.

FIG. 15 is a diagram of the distribution of the amount of light of the light source 31 corresponding to the tentative required luminance in the divided regions Dd of any row number. The vertical and horizontal axes in FIG. 15 are the same as those in FIG. 9. FIG. 15 illustrates the required amount of light Le of the divided region Dd and distribution D3 of the amount of light of the light source 31 corresponding to the tentative required luminance of the light source 31 in each of the divided regions Dd.

If the luminance of the light source 31 is the tentative required luminance, the maximum value of the amount of light of the light source 31 is slightly smaller than the required amount of light Le of the divided region Dd in each of the divided regions Dd.

The drive circuit 21 calculates the required luminance of the light source 31 at Step S24 illustrated in FIG. 13. The required luminance of the light source 31 (which may be hereinafter simply referred to as the required luminance) is the luminance of the light source 31 at which the amount of light of the divided region Dd is equal to or larger than the required amount of light Le of the divided region Dd calculated by the drive circuit 21 at Step S22 in each of the divided regions Dd. First, the drive circuit 21 calculates the total amount of light of the light source 31, which is the amount of light obtained by synthesizing the lights of a plurality of light sources 31, in each of the divided regions Dd. In each of the divided regions Dd, the total amount of light of the light source 31 corresponds to the amount of light of the divided region Dd.

Figure 16:
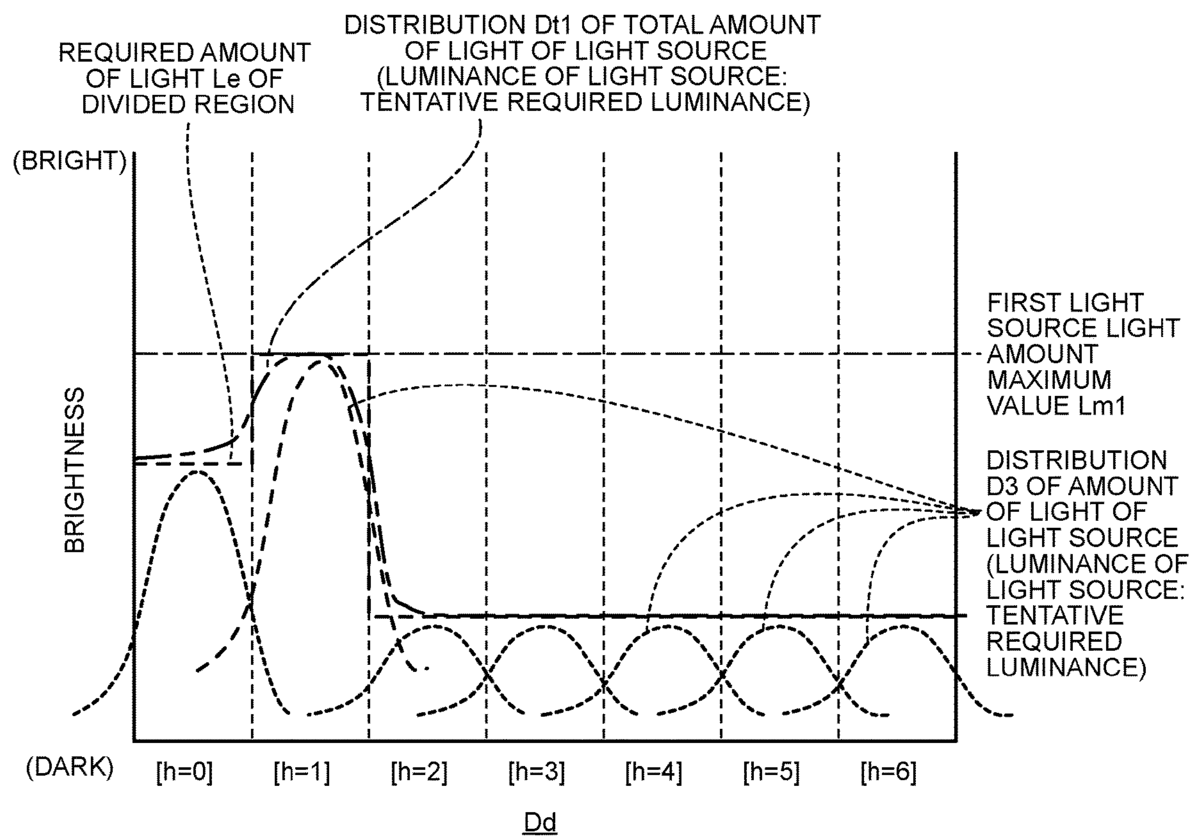
FIG. 16 is a diagram of the distribution of the total amount of light of the light source corresponding to the tentative required luminance in the divided regions of any row number.

FIG. 16 is a diagram of the distribution of the total amount of light of the light source 31 corresponding to the tentative required luminance in the divided regions Dd of any row number. The vertical and horizontal axes in FIG. 16 are the same as those in FIG. 9. FIG. 16 illustrates the required amount of light Le of the divided region Dd, the distribution D3 of the amount of light of the light source 31 corresponding to the tentative required luminance of the light source 31 in each of the divided regions Dd, and distribution Dt1 of the total amount of light of the light source 31 corresponding to the tentative required luminance of the light source 31.

As illustrated in FIG. 16, in the divided regions Dd in the [h=0]-th, [h=2]-th, [h=3]-th, [h=4]-th, [h=5]-th, and [h=6]-th columns, the lights of a plurality of light sources 31 are synthesized, and the total amount of light of the light source 31 (i.e., the amount of light of the divided region Dd) is equal to or larger than the required amount of light Le of the divided region Dd. In the divided region Dd in the [h=1]-th column, however, the total amount of light of the light source 31 is equal to or smaller than the required amount of light Le of the divided region Dd. Therefore, the drive circuit 21 calculates the required luminance that makes the total amount of light of the light source 31 in the [h=1]-th column equal to or larger than the required amount of light Le of the divided region Dd.

The required luminance is the luminance of the light source 31 equal to or lower than the second light source luminance. The drive circuit 21 selects the light source 31 the luminance of which is to be increased based on the total amount of light of the light source 31 corresponding to the tentative required luminance, and adjusts the luminance of the selected light source 31.

Figure 17:
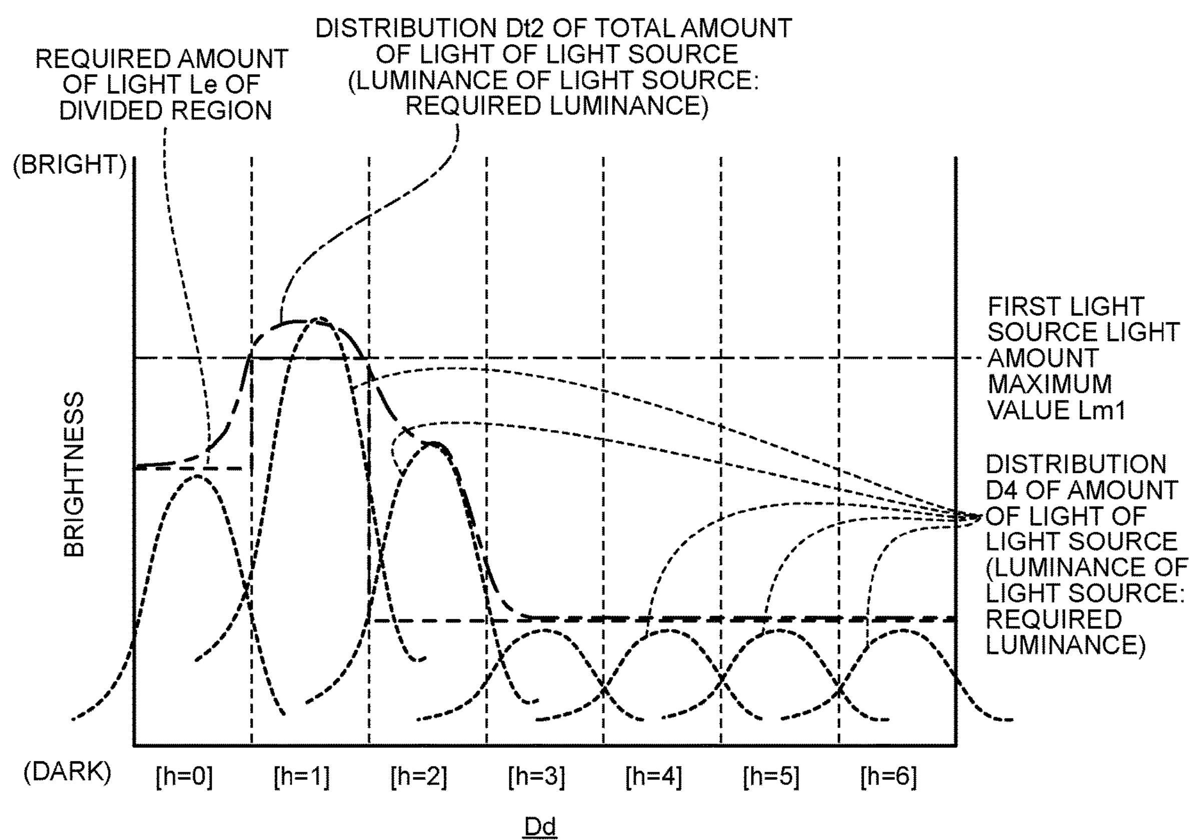
FIG. 17 is a diagram of the distribution of the total amount of light of the light source corresponding to the required luminance in the divided regions of any row number.

FIG. 17 is a diagram of the distribution of the total amount of light of the light source 31 corresponding to the required luminance in the divided regions Dd of any row number. The vertical and horizontal axes in FIG. 17 are the same as those in FIG. 9. FIG. 17 illustrates the required amount of light Le of the divided region Dd, distribution D4 of the amount of light of the light source 31 corresponding to the required luminance of the light source 31 in each of the divided regions Dd, and distribution Dt2 of the total amount of light of the light source 31 corresponding to the required luminance of the light source 31.

The drive circuit 21 makes the luminance of the light source 31 corresponding to the divided regions Dd in the [h=1]-th and [h=2]-th columns higher than the tentative required luminance. As a result, the amount of light of the light source 31 in the divided regions Dd in the [h=1]-th and [h=2]-th columns increases, whereby the total amount of light of the light source 31 is equal to or larger than the required amount of light Le of the divided region Dd in each of the divided regions Dd. The luminance of the light source 31 corresponding to each of the divided regions Dd at this time is the required luminance.

The drive circuit 21 may make the total amount of light of the light source 31 equal to or larger than the required amount of light Le of the divided region Dd in a plurality of divided regions Dd by making the required luminance of the light source 31 corresponding to the divided region Dd in the [h=1]-th column equal to the tentative required luminance and making the required luminance of the light source 31 corresponding to the divided regions Dd in the [h=0]-th and [h=2]-th columns higher than the tentative required luminance.

After the processing at Step S24 illustrated in FIG. 13 is finished, the drive circuit 21 terminates the required luminance calculation for the light source 31 and calculates actual luminance of the light source 31 at Step S13 illustrated in FIG. 12. The actual luminance of the light source 31 (which may be hereinafter simply referred to as actual luminance) is the luminance of the light source 31 calculated based on the required luminance and used to actually adjust the luminance of the light source 31. In the first lighting control according to the present embodiment, the drive circuit 21 sets the actual luminance to the required luminance calculated at Step S12.

The drive circuit 21 generates light source signals including information on the actual luminance of the light source 31 and outputs the light source signals to the light source control circuit 32. The light source control circuit 32 adjusts the luminance of each of the light sources 31 to the actual luminance. The transmittance of the sub-pixel SP (=luminance of the sub-pixel SP/actual luminance of the light source 31) is calculated from the actual luminance of the light source 31 and the luminance of the sub-pixel SP as described above, and the sub-pixel signals including information on the transmittance of the sub-pixel SP are output to a plurality of sub-pixels SP. As a result, the luminance of the sub-pixel SP calculated by the drive circuit 21 is obtained, whereby the display image is displayed in the display region DA.

After the processing at Step S13 is finished, the drive circuit 21 terminates the first lighting control and performs the processing at Step S1 illustrated in FIG. 11 again. If the amount of movement per unit time of the display panel 20 remains smaller than the predetermined amount of movement due to a relatively small motion of the user's head (No at Step S1), the drive circuit 21 repeatedly performs the processing at Steps S1 and S2 every unit time. In other words, the drive circuit 21 acquires the information on the display image every unit time, and the display image is displayed in the display region DA every unit time.

By contrast, if the amount of movement per unit time of the display panel 20 is equal to or larger than the predetermined amount of movement due to a relatively large motion of the user's head (Yes at Step S1), the drive circuit 21 performs second lighting control at Step S3. The second lighting control is control performed by the drive circuit 21 to turn on all the light sources 31.

Figure 18:
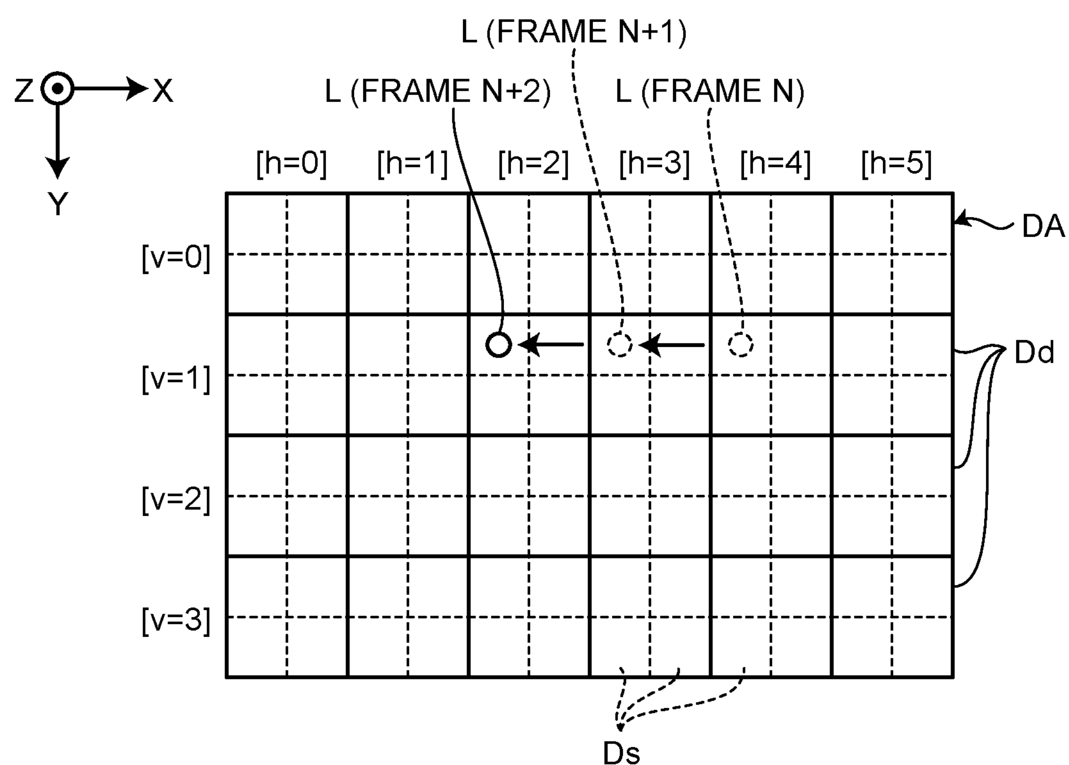
FIG. 18 is a diagram of the display region for displaying the display image that changes depending on a motion of the user.

FIG. 18 is a diagram of the display region DA for displaying the display image that changes depending on a motion of the user. The following describes the second lighting control using the display image illustrated in FIG. 18 that changes depending on the user's motion. In the following description, the small divided region Ds in the [v=i]-th row and the [h=j]-th column is denoted as the small divided region Ds(i, j), and the divided region Dd in the [v=i]-th row and the [h=j]-th column is denoted as the divided region Dd(i, j).

The display image illustrated in FIG. 18 has a part with relatively high luminance (hereinafter referred to as a high-luminance part L). The size of the high-luminance part L is smaller than that of the small divided region Ds.

The high-luminance part L is set to move to the −X side along the X-direction with the motion of the user's head. Specifically, the high-luminance part L moves along the X-direction in the order of the divided region Dd(1, 4), the divided region Dd (1, 3), and the divided region Dd (1, 2) in a frame N, a frame N+1, and a frame N+2, respectively. N is a natural number, and the frame N+2 is the frame subsequent to the frame N+1, and the frame N+1 is the frame subsequent to the frame N.

In each of the divided regions Dd, the high-luminance part L is set to be positioned in the small divided region Ds on the −X side and the +Y side. The amount of movement of the high-luminance part L between the frames N and N+1 and between the frames N+1 and N+2 is set to be equal to the length of one side of the divided region Dd (i.e., the length of the divided region Dd in the X-direction (or the length of the divided region Dd in the Y-direction)).

The gradation of the sub-pixel SP corresponding to the high-luminance part L is the maximum value of the gradation of the sub-pixel SP. In the following description, the luminance of the sub-pixel SP calculated by the drive circuit 21 based on the maximum value of the gradation of the sub-pixel SP is set to 100 to simplify the explanation. In other words, the luminance of the sub-pixel SP corresponding to the high-luminance part L is 100. The first region light amount Lr (refer to FIG. 9) according to the present embodiment is set to 100. In other words, the transmittance of the sub-pixel SP corresponding to the high-luminance part L is 100%.

The first light source luminance, which is the luminance of the light source 31 corresponding to the first light source light amount maximum value Lm1 (refer to FIG. 9), is set to 100. In other words, when the luminance of each of the light sources 31 uniformly changes from 0 to the first light source luminance (100), the lights of a plurality of light sources 31 are synthesized in each of the divided regions Dd, and the amount of light of the divided region Dd uniformly changes from 0 to the first region light amount Lr (100). If the luminance of a certain light source 31 is 115, and the luminance of the other light sources 31 is 0, the maximum value of the amount of light of the light source 31 in one divided region Dd corresponding to the certain light source 31 is set to be equal to the first region light amount Lr (100). The second light source luminance, which is the luminance of the light source 31 corresponding to the second light source light amount maximum value Lm2, is set to 150.

The luminance of the sub-pixels SP corresponding to the parts other than the high-luminance part L in the display image illustrated in FIG. 18 is set to 0. In other words, the parts other than the high-luminance part L are in black in the display image.

In the frames before the frame N, the high-luminance part L is set to be stationary in the small divided region Ds on the −X side and the +Y side in the divided region Dd (1, 4). In other words, the drive circuit 21 adjusts the luminance of the light sources 31 by the first lighting control described above from the frames before the frame N to the frame N.

Before the explanation of the second lighting control, the following describes the operation of the drive circuit 21 that calculates the actual luminance of the light source 31 in the frame N by the first lighting control.

The drive circuit 21 acquires the display image of the frame N at Step S11 illustrated in FIG. 12. Subsequently, the drive circuit 21 performs the required luminance calculation for the light source 31 illustrated in FIG. 13 at Step S12. The drive circuit 21 calculates the required amount of light of the small divided region Ds as described above at Step S21.

FIG. 19 is a diagram of the required amount of light of the small divided regions Ds and the required amount of light of the divided regions Dd corresponding to the display image of the frame N.

As described above, in the display image of the frame N, the high-luminance part L is positioned in the small divided region Ds on the −X side and the +Y side in the divided region Dd (1, 4) (refer to FIG. 18), and the luminance of the sub-pixel SP corresponding to the high-luminance part L is 100. Therefore, in the frame N illustrated in the upper part of FIG. 19, the drive circuit 21 sets the required amount of light of the small divided region Ds on the −X side and the +Y side in the divided region Dd (1, 4) to 100 at Step S21. The drive circuit 21 sets the required amount of light of the small divided regions Ds other than the small divided region Ds to 0.

Subsequently, the drive circuit 21 calculates the required amount of light of the divided region Dd as described above at Step S22 illustrated in FIG. 13. In the frame N illustrated in the lower part of FIG. 19, the drive circuit 21 sets the required amount of light of the divided region Dd (1, 4) to 100 and sets the required amount of light of the divided regions Dd other than the divided region Dd (1, 4) to 0. The drive circuit 21 calculates the tentative required luminance of the light source 31 as described above at Step S23 illustrated in FIG. 13.

FIG. 20 is a diagram of the tentative required luminance of the light source 31, the required luminance of the light source 31, and the actual luminance of the light source 31 corresponding to the required amount of light of the divided regions Dd of the frame N illustrated in FIG. 19.

In the frame N illustrated in the upper part of FIG. 20, the drive circuit 21 sets the tentative required luminance of the divided region Dd (1, 4) to 115 based on the required amount of light (100) of the divided region Dd (1, 4) at Step S23 illustrated in FIG. 13. If the luminance of a certain light source 31 is set to 115, the maximum value of the amount of light of the light source 31 in one divided region Dd corresponding to the certain light source 31 is equal to the first region light amount Lr (100) as described above.

The drive circuit 21 sets the tentative required luminance of the divided regions Dd other than the divided region Dd (1, 4) to 0 based on the required amount of light (0) of the divided regions Dd. In this case, the amount of light of the divided region Dd is equal to or larger than the required amount of light of the divided region Dd at the center of the divided region Dd (1, 4). In the entire divided region Dd (1, 4), however, there is a part where the amount of light of the divided region Dd is smaller than the required amount of light of the divided region Dd.

Subsequently, the drive circuit 21 calculates the required luminance of the light source 31 as described above at Step S24 illustrated in FIG. 13. In the frame N illustrated in the middle part of FIG. 20, the drive circuit 21 causes the required luminance of the divided region Dd (1, 4) to remain at 115 and sets the required luminance of the divided regions Dd (1, 3) and Dd (0, 4) to 50. The tentative required luminance corresponding to the divided regions Dd (1, 3) and Dd (0, 4) adjacent in the X- and Y-directions to the small divided region Ds where the high-luminance portion L is positioned is 50, which is higher than 0. As a result, the amount of light of the divided region Dd is equal to or larger than the required amount of light of the divided region Dd in the entire divided region Dd (1, 4).

The drive circuit 21 calculates the actual luminance of the light source 31 as described above at Step S13 illustrated in FIG. 12. In the frame N illustrated in the lower part of FIG. 20, the drive circuit 21 sets the actual luminance to the tentative actual luminance illustrated in the middle part of FIG. 20.

Thus, the light sources 31 are adjusted at the actual luminance illustrated in the lower part of FIG. 20 by the first lighting control from the frames before the frame N when the high-luminance part L is stationary to the frame N.

By contrast, if the amount of movement per unit time of the display panel 20 is equal to or larger than the predetermined amount of movement due to a relatively large motion of the user's head before the drive circuit 21 acquires the information on the display image of the frame N+1 (Yes at Step S1 in FIG. 11), the drive circuit 21 performs the second lighting control at Step S3.

Figure 21:
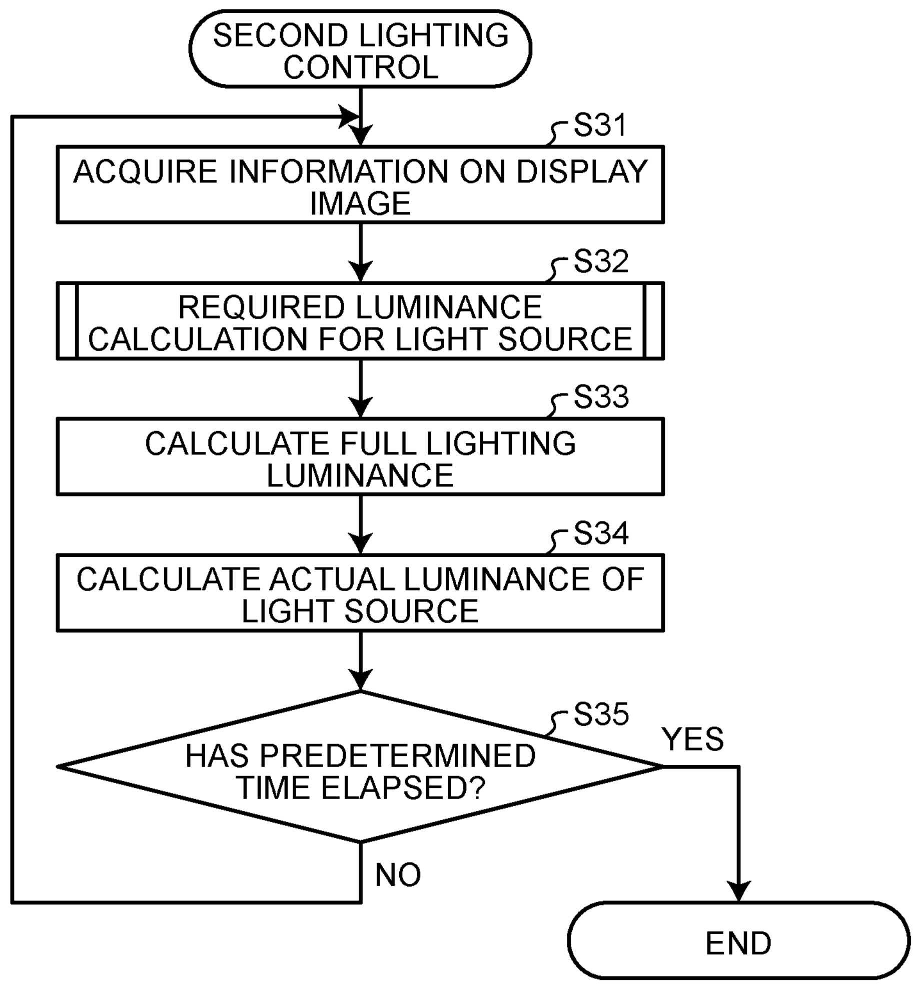
FIG. 21 is a flowchart of second lighting control performed by the drive circuit.

FIG. 21 is a flowchart of the second lighting control performed by the drive circuit 21. The drive circuit 21 acquires information on the display image of the frame N+1 at Step S31.

Subsequently, the drive circuit 21 performs the required luminance calculation for the light source 31 illustrated in FIG. 13 at Step S32. The drive circuit 21 calculates the required amount of light of the small divided region Ds as described above at Step S21.

FIG. 22 is a diagram of the required amount of light of the small divided regions Ds and the required amount of light of the divided regions Dd corresponding to the display image of the frame N+1. In the display image of the frame N+1, the high-luminance part L is positioned in the small divided region Ds on the −X side and the +Y side in the divided region Dd (1, 3) (refer to FIG. 18), and the luminance of the sub-pixel SP corresponding to the high-luminance part L is 100.

Therefore, in the frame N+1 illustrated in the upper part of FIG. 22, the drive circuit 21 sets the required amount of light of the small divided region Ds on the −X side and the +Y side in the divided region Dd (1, 3) to 100. The drive circuit 21 sets the required amount of light of the small divided regions Ds other than the small divided region Ds to 0.

Subsequently, the drive circuit 21 calculates the required amount of light of the divided region Dd as described above at Step S22 illustrated in FIG. 13. In the frame N+1 illustrated in the lower part of FIG. 22, the drive circuit 21 sets the required amount of light of the divided region Dd (1, 3) to 100 and sets the required amount of light of the divided regions Dd other than the divided region Dd (1, 3) to 0. The drive circuit 21 calculates the tentative required luminance of the light source 31 at Step S23 illustrated in FIG. 13 in the same manner as in the processing described above.

FIG. 23 is a diagram of the tentative required luminance of the light source 31, the required luminance of the light source 31, and the actual luminance of the light source 31 corresponding to the required amount of light of the divided regions Dd of the frame N+1 illustrated in FIG. 22.

In the frame N+1 illustrated in the upper part of FIG. 23, the drive circuit 21 sets the tentative required luminance of the divided region Dd (1, 3) to 115 based on the required amount of light (100) of the divided region Dd (1, 3). The drive circuit 21 sets the tentative required luminance of the divided regions Dd other than the divided region Dd (1, 3) to 0 based on the required amount of light (0) of the divided regions Dd.

Subsequently, the drive circuit 21 calculates the required luminance of the light source 31 as described above at Step S24 illustrated in FIG. 13. In the frame N+1 illustrated in the middle part of FIG. 23, the drive circuit 21 causes the required luminance of the divided region Dd (1, 3) to remain at 115 and sets the required luminance of the divided regions Dd (1, 2) and Dd (0, 3) to 50. As a result, the amount of light of the divided region Dd is equal to or larger than the required amount of light of the divided region Dd in the entire divided region Dd(1, 3).

After the drive circuit 21 terminates the required luminance calculation for the light source 31 at Step S32 illustrated in FIG. 21, it calculates full lighting luminance at Step S33. The full lighting luminance is the luminance of the light source 31 used to calculate the actual luminance when all the light sources 31 are turned on in the second lighting control. The full lighting luminance according to the present embodiment corresponds to first full lighting luminance. The first full lighting luminance is the luminance of the light source 31 at which the amount of light of the divided region Dd is the largest required amount of light out of the required amounts of light of the divided regions Dd in each of the divided regions Dd in the present frame when the drive circuit 21 turns on each of the light sources 31.

Specifically, the drive circuit 21 first specifies the largest required amount of light out of the required amounts of light of the divided regions Dd. In the frame N+1 illustrated in the lower part of FIG. 22, the largest required amount of light out of the required amounts of light of the divided regions Dd is 100. When the luminance of all the light sources 31 is the first light source luminance (100), the amount of light of the divided region Dd in each of the divided regions Dd is the first region light amount Lr (100) illustrated in FIG. 9 as described above. In other words, the luminance of the light source 31 at which the amount of light of the divided region Dd is the largest required amount of light (100) in each of the divided regions Dd is 100. Therefore, the drive circuit 21 sets the first full lighting luminance to 100.

The drive circuit 21 calculates the actual luminance of the light source 31 at Step S34 illustrated in FIG. 21. In the second lighting control, the drive circuit 21 sets the actual luminance of the light source 31 corresponding to all the divided regions Dd to the first full lighting luminance (100) calculated at Step S33. In the frame N+1 illustrated in the lower part of FIG. 23, the actual luminance of the light source 31 is 100 in all the divided regions Dd. Therefore, the light source control circuit 32 adjusts the luminance of each of the light sources 31 to the actual luminance (100).

As described above, if the drive circuit 21 selects the second lighting control, it specifies the largest required amount of light out of the required amounts of light of the divided regions Dd. The drive circuit 21 turns on each of the light sources 31 at the first full lighting luminance that is the luminance of the light source 31 at which the amount of light of the divided region Dd is the largest required amount of light in each of the divided regions Dd when it turns on each of the light sources 31.

Subsequently, the drive circuit 21 determines whether a predetermined time has elapsed at Step S35 illustrated in FIG. 21. The predetermined time is defined to be a time equal to or longer than a standard time for the display panel 20 to move due to a motion of the user. The predetermined time is longer than the unit time and is two seconds, for example. The predetermined time is derived through experiments, simulations, and the like performed in advance and is stored in the storage unit of the drive circuit 21.

If the predetermined time has not elapsed since the time when the second lighting control is started (No at Step S35), the drive circuit 21 performs the processing at Step S31 again and acquires information on the display image of the frame N+2. The drive circuit 21 performs the required luminance processing for the light source 31 illustrated in FIG. 13 at Step S32. The drive circuit 21 calculates the required amount of light of the small divided region Ds as described above at Step S21.

FIG. 24 is a diagram of the required amount of light of the small divided regions Ds and the required amount of light of the divided regions Dd corresponding to the display image of the frame N+2. In the display image of the frame N+2, the high-luminance part L is positioned in the small divided region Ds on the −X side and the +Y side in the divided region Dd (1, 2) (refer to FIG. 18), and the luminance of the sub-pixel SP corresponding to the high-luminance part L is 100.

Therefore, in the frame N+2 illustrated in the upper part of FIG. 24, the drive circuit 21 sets the required amount of light of the small divided region Ds on the −X side and the +Y side in the divided region Dd (1, 2) to 100. The drive circuit 21 sets the required amount of light of the small divided regions Ds other than the small divided region Ds to 0.

Subsequently, the drive circuit 21 calculates the required amount of light of the divided region Dd as described above at Step S22 illustrated in FIG. 13. In the frame N+2 illustrated in the lower part of FIG. 24, the drive circuit 21 sets the required amount of light of the divided region Dd (1, 2) to 100 and sets the required amount of light of the divided regions Dd other than the divided region Dd (1, 2) to 0. The drive circuit 21 calculates the tentative required luminance of the light source 31 at Step S23 illustrated in FIG. 13 in the same manner as in the frame N described above.

FIG. 25 is a diagram of the tentative required luminance of the light source 31, the required luminance of the light source 31, and the actual luminance of the light source 31 corresponding to the required amount of light of the divided regions Dd of the frame N+2 illustrated in FIG. 24.

In the frame N+2 illustrated in the upper part of FIG. 25, the drive circuit 21 sets the tentative required luminance of the divided region Dd (1, 2) to 115 based on the required amount of light (100) of the divided region Dd (1, 2). The drive circuit 21 sets the tentative required luminance of the divided regions Dd other than the divided region Dd (1, 2) to 0 based on the required amount of light (0) of the divided regions Dd.

Subsequently, the drive circuit 21 calculates the required luminance of the light source 31 as described above at Step S24 illustrated in FIG. 13. In the frame N+2 illustrated in the middle part of FIG. 25, the drive circuit 21 causes the required luminance of the divided region Dd (1, 2) to remain at 115 and sets the required luminance of the divided regions Dd (1, 1) and Dd (0, 2) to 50. As a result, the amount of light of the divided region Dd is equal to or larger than the required amount of light of the divided region Dd in the entire divided region Dd (1, 2).

After the drive circuit 21 terminates the required luminance calculation for the light source 31 at Step S32 illustrated in FIG. 21, it calculates the full lighting luminance at Step S33 in the same manner as in the frame N+1 described above.

In the frame N+2 illustrated in the lower part of FIG. 24, the largest required amount of light of the divided region Dd is 100. As described above, the luminance of the light source 31 at which the amount of light of the divided region Dd is the largest required amount of light (100) in each of the divided regions Dd is the first light source luminance (100). Therefore, the drive circuit 21 sets the first full lighting luminance to 100.

The drive circuit 21 calculates the actual luminance of the light source 31 at Step S34 illustrated in FIG. 21 in the same manner as in the frame N+1 described above. In the second lighting control, the drive circuit 21 sets the actual luminance of the light source 31 corresponding to all the divided regions Dd to the first full lighting luminance (100) calculated at Step S33. In the frame N+2 illustrated in the lower part of FIG. 9, the actual luminance of the light source 31 is 100 in all the divided regions Dd. Therefore, the light source control circuit 32 adjusts the luminance of each of the light sources 31 to the actual luminance (100).

Subsequently, the drive circuit 21 determines whether a predetermined time has elapsed at Step S35 illustrated in FIG. 21. If the predetermined time has not elapsed since the time when the second lighting control is started (No at Step S35), the drive circuit 21 performs the processing at Step S31 again and acquires information on the display image of a frame N+3. Subsequently, the drive circuit 21 performs the required luminance processing for the light source 31 at Step S32.

In the following description, the display images of the frame N+3 and the subsequent frames are assumed to be the same as the display image of the frame N+2 to simplify the explanation. In other words, the high-luminance part L is stationary in the frame N+3 and the subsequent frames. Therefore, in the frame N+3 and the subsequent frames, the luminance of each of the light sources 31 is adjusted to the actual luminance (100) in the same manner as in the frame N+2 described above in the second lighting control.

Thus, the actual luminance of each of the light sources 31 is adjusted to the first full lighting luminance (100) in the second lighting control. As a result, the amount of light of the divided region Dd is 100 in each of the divided regions Dd. The transmittance of the sub-pixel SP corresponding to the high-luminance part L is 100% as described above. Therefore, if the high-luminance part L moves in the order of the frames N, N+1, and N+2 due to a motion of the user's head, the luminance of the sub-pixel SP corresponding to the high-luminance part L is 100. As a result, the drive circuit 21 can display the high-luminance part L in the display region DA at the calculated luminance (100) of the sub-pixel SP.

The second lighting control can suppress blinking caused by light leakage that occurs in a region where the luminance of the sub-pixel SP is relatively low due to the movement of the high-luminance part L in the display region DA. The blinking occurs, for example, when the amount of movement per unit time of the display panel 20 is equal to or larger than the predetermined amount of movement (Yes at Step S1 in FIG. 11) and the first lighting control is performed instead of the second lighting control at Step S3 in FIG. 11.

The following describes the blinking that occurs when the drive circuit 21 performs the first lighting control instead of the second lighting control at Step S3 and acquires the information on the display image illustrated in FIG. 19 in the frames N+1 and N+2.

In this case, the drive circuit 21 sets the required luminance of the light source 31 to the values illustrated in the middle part of FIG. 23 and the middle part of FIG. 25 in the frames N+1 and N+2, respectively. In the first lighting control according to the present embodiment, the actual luminance of the light source 31 is set to the required luminance of the light source 31. In other words, the actual luminance of the light source 31 is the values illustrated in the middle part of FIG. 23 and the middle part of FIG. 25.

The luminance of the sub-pixel SP corresponding to the part of the display region DA other than the high-luminance part L is 0 as described above, and the transmittance of the sub-pixel SP is 0%. In this case, in the divided region Dd (0, 3) in FIG. 20 (frame N), for example, the transmittance of the sub-pixel SP is 0%, and the actual luminance of the light source 31 is 0 (refer to the lower part of FIG. 20). As a result, no light leakage occurs between a plurality of sub-pixels SP. By contrast, in the divided region Dd (0, 4) in FIG. 20 (frame N), the transmittance of the sub-pixel SP is 0%, and the actual luminance of the light source 31 is 50 (refer to the lower part of FIG. 20). As a result, light leakage occurs between a plurality of sub-pixels SP. In other words, both the divided regions Dd (0, 3) and Dd (0, 4) in FIG. 20 (frame N) display black, but the brightness of the divided region Dd (0, 4) is slightly higher than that of the divided region Dd (0, 3) due to the light leakage.

In the divided region Dd (0, 3) of the frame N+1, the transmittance of the sub-pixel SP is 0%, and the actual luminance of the light source 31 (equal to the required luminance illustrated in FIG. 23) is 50. As a result, light leakage occurs between a plurality of sub-pixels SP. In other words, when the frame is changed from the frame N to the frame N+1, the divided region Dd (0, 3) continues to display black, but the brightness of the divided region Dd (0, 3) slightly increases. In other words, blinking occurs in the divided region Dd (0, 3) between the frames N and N+1.

In the divided region Dd (0, 4) of the frame N+1, the transmittance of the sub-pixel SP is 0%, and the actual luminance of the light source 31 (equal to the required luminance illustrated in FIG. 23) is 0. As a result, no light leakage occurs between a plurality of sub-pixels SP. In other words, when the frame is changed from the frame N to the frame N+1, the divided region Dd (0, 4) continues to display black, but the brightness of the divided region Dd (0, 4) slightly decreases. In other words, blinking occurs in the divided region Dd (0, 4) between the frames N and N+1.

Similarly, when the frame is changed from the frame N+1 to the frame N+2, the divided region Dd (0, 3) continues to display black, but the brightness of the divided region Dd (0, 3) slightly decreases. As a result, blinking occurs in the divided region Dd (0, 3). Similarly, when the frame is changed from the frame N+1 to the frame N+2, the divided region Dd (0, 2) continues to display black, but the brightness of the divided region Dd (0, 2) slightly increases. As a result, blinking occurs in the divided region Dd (0, 2).

By contrast, if the second lighting control is performed at Step S3 illustrated in FIG. 11 as described above, the actual luminance of each of the light sources 31 is 100 in the frames N+1 and N+2. Therefore, the blinking in the divided regions Dd (0, 2), Dd(0, 3), and Dd (0, 4) can be suppressed.

If the predetermined time has elapsed since the time when the second lighting control is started (Yes at Step S35 illustrated in FIG. 21), the drive circuit 21 terminates the second lighting control and performs the processing at Step S1 illustrated in FIG. 11 again.

Thus, the drive circuit 21 selects the second lighting control based on the fact that the amount of movement per unit time of the display panel 20 is equal to or larger than the predetermined amount of movement. In other words, the drive circuit 21 controls the light source device 30 by selecting one of the first lighting control for adjusting the luminance of the light source 31 for each of the light sources 31 based on the image signals and the second lighting control for turning on all the light sources 31.

The following describes the display system 100 according to a first modification of the embodiment described above focusing mainly on the differences from the display system 100 according to the embodiment described above. The second lighting control according to the first modification has differences from that according to the embodiment described above.

The following describes the case where the drive circuit 21 acquires the information on the display image illustrated in FIG. 18 similarly to the embodiment described above. In this case, similarly to the embodiment described above, the first lighting control is performed from the frames before the frame N to the frame N. In the frame N, the required amount of light of the divided region Dd illustrated in FIG. 19 and the tentative required luminance, the required luminance, and the actual luminance illustrated in FIG. 20 are calculated. In this state, when the amount of movement per unit time of the display panel 20 is equal to or larger than the predetermined amount of movement, the drive circuit 21 determines that it is YES at Step S1 illustrated in FIG. 11 and performs the second lighting control at Step S3.

Figure 26:
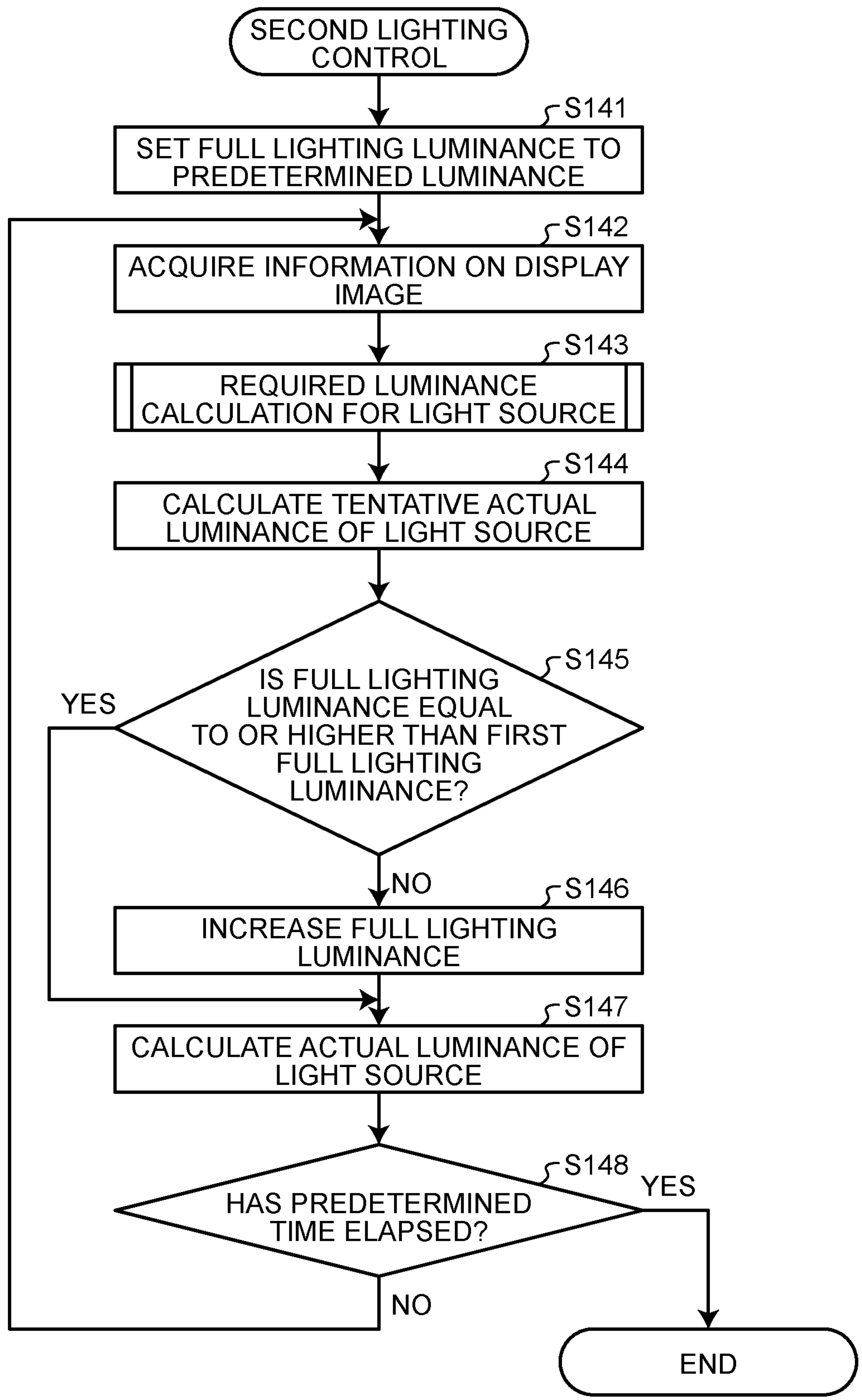
FIG. 26 is a flowchart of the second lighting control performed by the drive circuit according to a first modification of the embodiment of the present disclosure.

FIG. 26 is a flowchart of the second lighting control performed by the drive circuit 21 according to the first modification of the embodiment of the present disclosure. The drive circuit 21 sets the full lighting luminance to predetermined luminance at Step S141 illustrated in FIG. 26. The predetermined luminance is the luminance of the light source 31 lower than the first full lighting luminance. The predetermined luminance is 0, for example. In the following description, the predetermined luminance is assumed to be 0.

Subsequently, the drive circuit 21 acquires information on the display image of the frame N+1 at Step S142 and performs the required luminance calculation for the light source 31 at Step S143 similarly to Step S32 (refer to FIG. 21 and FIG. 13) according to the embodiment described above. Thus, the drive circuit 21 calculates the required amount of light of the divided region Dd illustrated in the lower part of FIG. 22 (frame N+1) at Step S143. Similarly, the drive circuit 21 calculates the required luminance of the light source 31 at Step S143.

FIG. 27 is a diagram of the required luminance of the light source 31, tentative actual luminance of the light source 31, and the actual luminance of the light source 31 in the divided regions Dd of the frame N+1 according to the first modification of the embodiment of the present disclosure. The drive circuit 21 calculates the required luminance illustrated in the upper part of FIG. 27 (identical to the required luminance illustrated in the middle part of FIG. 23) at Step S143.

The drive circuit 21 calculates tentative actual luminance of the light source 31 (which may be hereinafter simply referred to as tentative actual luminance) at Step S144 illustrated in FIG. 26. The tentative actual luminance is the luminance of the light source 31 used to calculate the actual luminance when all the light sources 31 are turned on in the second lighting control according to the first modification.

The drive circuit 21 according to the first modification sets the tentative actual luminance to the required luminance of the present frame. Therefore, in the frame N+1 illustrated in the middle part of FIG. 27, the drive circuit 21 sets the tentative actual luminance to the required luminance of the present frame N+1 (refer to the upper part of FIG. 27).

Subsequently, the drive circuit 21 determines whether the full lighting luminance is equal to or higher than the first full lighting luminance at Step S145 illustrated in FIG. 26. The first full lighting luminance is the luminance of the light source 31 at which the amount of light of the divided region Dd is the largest required amount of light out of the required amounts of light of the divided regions Dd in each of the divided regions Dd in the present frame when the drive circuit 21 turns on each of the light sources 31. The first full lighting luminance at the present time is set to 100 similarly to the embodiment described above.

The full lighting luminance at the present time is 0, which is lower than the first full lighting luminance (100). In this case (No at Step S145), the drive circuit 21 increases the full lighting luminance at Step S146. In the first modification, the increment in full lighting luminance is 50% of the first full lighting luminance. In other words, the drive circuit 21 sets the full lighting luminance to 50 (=0 (Predetermined Luminance)+100 (First Full Lighting Luminance)×0.5) at Step S146.

The drive circuit 21 calculates the actual luminance of the light source 31 at Step S147. In the first modification, if the tentative actual luminance is equal to or lower than the first full lighting luminance in each of the divided regions Dd, the drive circuit 21 compares first comparison luminance, which is the luminance of the light source 31 calculated by the following Expression (A), with the full lighting luminance and determines one of them with a larger value to be the actual luminance. In Expression (A), C1 is a coefficient larger than 0 and equal to or smaller than 1 and is set to 1 in the first modification.

$$\text{First Comparison Luminance}=\text{Tentative Actual Luminance}\times C1 \tag{A}$$

Specifically, in the frame N+1 illustrated in the middle part of FIG. 27, the tentative actual luminance in the divided regions Dd other than the divided region Dd(1, 3) out of the divided regions Dd is 0 or 50, which is equal to or lower than the first full lighting luminance (100). In the divided regions Dd other than the divided region Dd (1, 3) out of the divided regions Dd, the first comparison luminance (0 (=0×1) or 50 (=50×1)) calculated by Expression (A) is equal to or lower than the full lighting luminance (50). Therefore, in the frame N+1 illustrated in the lower part of FIG. 27, the drive circuit 21 sets the actual luminance of the divided regions Dd other than the divided region Dd (1, 3) out of the divided regions Dd to the full lighting luminance (50).

By contrast, the drive circuit 21 compares second comparison luminance, which is the luminance of the light source 31 calculated by Expression (B), with the first full lighting luminance for the divided region Dd having the tentative actual luminance higher than the first full lighting luminance out of the divided regions Dd and determines one of them with a larger value to be the actual luminance of the divided region Dd. In Expression (B), C2 is a coefficient larger than 0 and equal to or smaller than 1 and is set to 1 in the first modification.

$$\text{Second Comparison Luminance}=\text{Tentative Actual Luminance}-\text{Full Lighting Luminance}\times C2 \tag{B}$$

Specifically, in the frame N+1 illustrated in the middle part of FIG. 27, the tentative actual luminance in the divided region Dd (1, 3) out of the divided regions Dd is 115, which is higher than the first full lighting luminance (100). In the divided region Dd (1, 3), the second comparison luminance (65 (=115−50×1)) calculated by Expression (B) is lower than the first full lighting luminance (100). Therefore, in the frame N+1 illustrated in the lower part of FIG. 27, the drive circuit 21 sets the actual luminance of the divided region Dd (1, 3) to the first full lighting luminance (100). As a result, the luminance of the light sources 31 is adjusted to the actual luminance illustrated in the lower part of FIG. 27.

Subsequently, the drive circuit 21 determines whether the predetermined time has elapsed at Step S148 illustrated in FIG. 26. If the predetermined time has not elapsed since the time when the second lighting control is started (No at Step S148), the drive circuit 21 performs the processing at Step S142 again and acquires information on the display image of the frame N+2. The drive circuit 21 performs the required luminance processing for the light source 31 at Step S143 in the same manner as described above.

Thus, the drive circuit 21 calculates the required amount of light of the divided region Dd illustrated in the lower part of FIG. 24 (frame N+2) at Step S143. Similarly, the drive circuit 21 calculates the required luminance of the light source 31 at Step S143.

FIG. 28 is a diagram of the required luminance of the light source 31, the tentative actual luminance of the light source 31, and the actual luminance of the light source 31 in the divided regions Dd of the frame N+2 according to the first modification of the embodiment of the present disclosure. The drive circuit 21 calculates the required luminance illustrated in the upper part of FIG. 28 (identical to the required luminance illustrated in the middle part of FIG. 25) at Step S143.

The drive circuit 21 calculates the tentative actual luminance of the light source 31 at Step S144. In the frame N+2 illustrated in the middle part of FIG. 28, the drive circuit 21 sets the tentative actual luminance to the required luminance of the frame N+2 (refer to the upper part of FIG. 28) in the same manner as described above.

Subsequently, the drive circuit 21 determines whether the full lighting luminance is equal to or higher than the first full lighting luminance at Step S145. The first full lighting luminance is 100 as described above.

The full lighting luminance is 50 at the present time and is lower than the first full lighting luminance (100). In this case (No at Step S145), the drive circuit 21 increases the full lighting luminance at Step S146. The increment in full lighting luminance is 50% of the first full lighting luminance as described above. In other words, the drive circuit 21 sets the full lighting luminance to 100 (=50+100 (First Full Lighting Luminance)×0.5) at Step S146. As a result, the full lighting luminance is equal to the first full lighting luminance.

The drive circuit 21 calculates the actual luminance of the light source 31 at Step S147. Specifically, in the frame N+2 illustrated in the middle part of FIG. 28, the tentative actual luminance in the divided regions Dd other than the divided region Dd (1, 2) out of the divided regions Dd is 0 or 50, which is equal to or lower than the first full lighting luminance (100). In the divided regions Dd other than the divided region Dd (1, 2) out of the divided regions Dd, the first comparison luminance (0 (=0×1) or 50 (=50×1)) calculated by Expression (A) is equal to or lower than the full lighting luminance (100). Therefore, in the frame N+2 illustrated in the lower part of FIG. 28, the drive circuit 21 sets the actual luminance of the divided regions Dd other than the divided region Dd (1, 2) out of the divided regions Dd to the full lighting luminance (100 (=first full lighting luminance)).

By contrast, in the frame N+2 illustrated in the middle part of FIG. 28, the tentative actual luminance in the divided region Dd (1, 2) out of the divided regions Dd is 115, which is higher than the first full lighting luminance (100). In the divided region Dd (1, 2), the second comparison luminance (15 (=115−100×1)) calculated by Expression (B) is lower than the full lighting luminance (100). Therefore, in the frame N+2 illustrated in the lower part of FIG. 28, the drive circuit 21 sets the actual luminance of the divided region Dd (1, 2) to the first full lighting luminance (100). Therefore, the actual luminance is the first full lighting luminance (100) in each of the divided regions Dd. The luminance of the light sources 31 is adjusted to the actual luminance (i.e., the first full lighting luminance) illustrated in the lower part of FIG. 28.

Subsequently, the drive circuit 21 determines whether the predetermined time has elapsed at Step S148. If the predetermined time has not elapsed since the time when the second lighting control is started (No at Step S148), the drive circuit 21 performs the processing at Step S142 again and acquires information on the display image of the frame N+3.

Similarly to the embodiment described above, the display images of the frame N+3 and the subsequent frames are the same as that of the frame N+2, and the high-luminance part L is stationary in the frame N+3 and the subsequent frames. Therefore, in the frame N+3 and the subsequent frames, the tentative actual luminance illustrated in the middle part of FIG. 28 is calculated in the same manner as in the frame N+2 described above in the second lighting control.

The full lighting luminance is 100, which is equal to or higher than the first full lighting luminance (100). In this case (Yes at Step S145), the drive circuit 21 calculates the actual luminance illustrated in the lower part of FIG. 28 at Step S147 in the same manner as in the frame N+2 described above. Therefore, if the second lighting control is performed in the frame N+3 and the subsequent frames, the luminance of the light sources 31 is adjusted to the actual luminance illustrated in the lower part of FIG. 28. The luminance of the light sources 31 at this time is equal to the first full lighting luminance.

As described above, if the drive circuit 21 according to the first modification selects the second lighting control, the drive circuit 21 gradually increases the luminance of the light source 31 from the luminance of the light source 31 lower than the first full lighting luminance to the first full lighting luminance from when it selects the second lighting control.

The following describes the display system 100 according to a second modification of the embodiment described above focusing mainly on the differences from the display system 100 according to the first modification of the embodiment described above. The second lighting control according to the second modification is different from that according to the first modification of the embodiment described above in the tentative actual luminance of the light source 31 calculated by the drive circuit 21 at Step S144 illustrated in FIG. 26. The following explanation starts with the point of time when the second lighting control is started and the drive circuit 21 finishes the processing at Step S143 in the frame N+1. Until this point of time, the drive circuit 21 operates in the same manner as in the first modification described above.

FIG. 29 is a diagram of the required luminance of the light source 31, tentative actual luminance of the light source 31, and the actual luminance of the light source 31 in the divided regions Dd of the frame N+1 according to the second modification of the embodiment of the present disclosure.

In the second modification, the drive circuit 21 calculates the average of the required luminance of the present frame and the actual luminance of the frame immediately before the present frame as the tentative actual luminance at Step S144 illustrated in FIG. 26.

Specifically, in the present frame N+1, the drive circuit 21 calculates the required luminance illustrated in the upper part of FIG. 29 (identical to the required luminance illustrated in the middle part of FIG. 23) at Step S143. In the frame N immediately before the present frame (frame N+1), the drive circuit 21 calculates the actual luminance illustrated in the lower part of FIG. 20. Therefore, in the frame N+1 illustrated in the middle part of FIG. 29, the tentative actual luminance of the divided region Dd (0, 3) is 25 (=(0 (refer to the lower part of FIG. 20)+50 (refer to the upper part of FIG. 29))/2), and the tentative actual luminance of the divided region Dd (0, 4) is 25 (=(50 (refer to the lower part of FIG. 20)+0 (refer to the upper part of FIG. 29))/2).

In the frame N+1 illustrated in the middle part of FIG. 29, the tentative actual luminance of the divided region Dd (1, 2) is 25 (=(0 (refer to the lower part of FIG. 20)+50 (refer to the upper part of FIG. 29))/2). Furthermore, as illustrated in the middle part of FIG. 29, the tentative actual luminance of the divided region Dd(1, 3) is 82.5 (=(50 (refer to the lower part of FIG. 20)+115 (refer to the upper part of FIG. 29))/2), and the tentative actual luminance of the divided region Dd (1, 4) is 57.5 (=(115 (refer to the lower part of FIG. 20)+0 (refer to the upper part of FIG. 29))/2).

The tentative actual luminance of the divided regions Dd other than the divided region Dd (0, 3), Dd (0, 4), Dd(1, 2), Dd(1, 3), or Dd(1, 4) described above out of the divided regions Dd is 0 (=(0 (refer to the lower part of FIG. 20)+0 (refer to the upper part of FIG. 29))/2).

Subsequently, the drive circuit 21 performs the processing at Steps S145 and S146 illustrated in FIG. 26 in the same manner as in the first modification described above and sets the full lighting luminance to 50. The drive circuit 21 performs the processing at Step S147 in the same manner as in the first modification described above and calculates the actual luminance.

Specifically, in the frame N+1 illustrated in the middle part of FIG. 29, the tentative actual luminance in each of the divided regions Dd is equal to or lower than the first full lighting luminance (100). In the divided regions Dd other than the divided region Dd (1, 3) or Dd (1, 4) out of the divided regions Dd, the first comparison luminance (0 (=0×1) or 25 (=25×1)) calculated by Expression (A) is equal to or lower than the full lighting luminance (50). Therefore, in the frame N+1 illustrated in the lower part of FIG. 29, the drive circuit 21 sets the actual luminance of the divided regions Dd other than the divided region Dd (1, 3) or Dd (1, 4) out of the divided regions Dd to the full lighting luminance (50).

In the frame N+1 illustrated in the middle part of FIG. 29, the tentative actual luminance of the divided regions Dd (1, 3) and Dd (1, 4) is 82.5 and 57.5. The first comparison luminance calculated by Expression (A) (82.5 (=82.5×1) or 57.5 (=57.5×1)) are higher than the full lighting luminance (50). Therefore, in the frame N+1 illustrated in the lower part of FIG. 29, the drive circuit 21 sets the actual luminance of the divided region Dd (1, 3) to 82.5 and sets that of the divided region Dd (1, 4) to 57.5. As a result, the luminance of the light sources 31 is adjusted to the actual luminance illustrated in the lower part of FIG. 29.

The following describes the case where the drive circuit 21 calculates the tentative actual luminance and the actual luminance in the frame N+2.

FIG. 30 is a diagram of the required luminance of the light source 31, the tentative actual luminance of the light source 31, and the actual luminance of the light source 31 in the divided regions Dd of the frame N+2 according to the second modification of the embodiment of the present disclosure.

At Step S144, the drive circuit 21 calculates the average of the required luminance of the present frame and the actual luminance of the frame immediately before the present frame as the tentative actual luminance as described above.

Specifically, in the present frame N+2, the drive circuit 21 calculates the required luminance illustrated in the upper part of FIG. 30 (identical to the required luminance illustrated in the middle part of FIG. 25) at Step S143. In the frame N+1 immediately before the present frame (frame N+2), the drive circuit 21 calculates the actual luminance illustrated in the lower part of FIG. 29.

Therefore, in the frame N+2 illustrated in the middle part of FIG. 30, the tentative actual luminance of the divided region Dd (0, 2) is 50 (=(50 (refer to the lower part of FIG. 29)+50 (refer to the upper part of FIG. 30))/2), and the tentative actual luminance of the divided region Dd (1, 1) is 50 (=(50 (refer to the lower part of FIG. 29)+50 (refer to the upper part of FIG. 30))/2).

In the frame N+2 illustrated in the middle part of FIG. 30, the tentative actual luminance of the divided region Dd (1, 2) is 82.5 (=(50 (refer to the lower part of FIG. 29)++115 (refer to the upper part of FIG. 30))/2). Furthermore, as illustrated in the middle part of FIG. 30, the tentative actual luminance of the divided region Dd (1, 3) is 41.25 (=(82.5 (refer to the lower part of FIG. 29)++0 (refer to the upper part of FIG. 30))/2), and the tentative actual luminance of the divided region Dd (1, 4) is 28.75 (=(57.5 (refer to the lower part of FIG. 29)+0 (refer to the upper part of FIG. 30))/2). The tentative actual luminance of the divided regions Dd other than the divided region Dd(0, 2), Dd(1, 1), Dd(1, 2), Dd(1, 3), or Dd (1, 4) out of the divided regions Dd is 25 (=(50 (refer to the lower part of FIG. 29)+0 (refer to the upper part of FIG. 30))/2).

Subsequently, the drive circuit 21 performs the processing at Steps S145 and S146 illustrated in FIG. 26 in the same manner as in the first modification described above and sets the full lighting luminance to 100. The drive circuit 21 performs the processing at Step S147 in the same manner as in the first modification described above and calculates the actual luminance.

Specifically, in the frame N+2 illustrated in the middle part of FIG. 30, the tentative actual luminance in each of the divided regions Dd is equal to or lower than the first full lighting luminance (100). In the divided regions Dd, the first comparison luminance (any of 25, 28.75, 41.25, 50, and 82.5) calculated by Expression (A) is equal to or lower than the full lighting luminance (100). Therefore, in the frame N+2 illustrated in the lower part of FIG. 30, the drive circuit 21 sets the actual luminance of each of the divided regions Dd to the full lighting luminance (100 (=first full lighting luminance)). As a result, the luminance of the light sources 31 is adjusted to the actual luminance illustrated in the lower part of FIG. 30. The luminance of the light sources 31 at this time is equal to the first full lighting luminance.

As described above, if the drive circuit 21 according to the second modification selects the second lighting control, the drive circuit 21 also gradually increases the luminance of the light source 31 from the luminance of the light source 31 lower than the first full lighting luminance to the first full lighting luminance from when it selects the second lighting control.

The following describes the display system 100 according to a third modification of the embodiment described above focusing mainly on the differences from the display system 100 according to the first modification of the embodiment described above. The second lighting control according to the third modification is different from that according to the first modification of the embodiment described above in the tentative actual luminance of the light source 31 calculated by the drive circuit 21 at Step S144 illustrated in FIG. 26. The following explanation starts with the point of time when the second lighting control is started and the drive circuit 21 finishes the processing at Step S143 in the frame N+1. Until this point of time, the drive circuit 21 operates in the same manner as in the first modification described above.

FIG. 31 is a diagram of the required luminance of the light source 31, the tentative actual luminance of the light source 31, and the actual luminance of the light source 31 in the divided regions Dd of the frame N+1 according to the third modification of the embodiment of the present disclosure.

In the third modification, the drive circuit 21 calculates the required luminance of the frame immediately before the present frame as the tentative actual luminance at Step S144 illustrated in FIG. 26.

Specifically, in the frame N immediately before the present frame (frame N+1), the drive circuit 21 calculates the required luminance illustrated in the middle part of FIG. 20. Therefore, in the frame N+1 illustrated in the middle part of FIG. 31, the drive circuit 21 sets the tentative actual luminance of each of the divided regions Dd to the required luminance illustrated in the middle part of FIG. 20.

Subsequently, the drive circuit 21 performs the processing at Steps S145 and S146 illustrated in FIG. 26 in the same manner as in the first modification described above and sets the full lighting luminance to 50. The drive circuit 21 performs the processing at Step S147 in the same manner as in the first modification described above and calculates the actual luminance.

Specifically, in the frame N+1 illustrated in the middle part of FIG. 31, the tentative actual luminance in the divided regions Dd other than the divided region Dd(1, 4) out of the divided regions Dd is 0 or 50, which is equal to or lower than the first full lighting luminance (100). In the divided regions Dd other than the divided region Dd (1, 4) out of the divided regions Dd, the first comparison luminance (0 (=0×1) or 50 (=50×1)) calculated by Expression (A) is equal to or lower than the full lighting luminance (50). Therefore, in the frame N+1 illustrated in the lower part of FIG. 31, the drive circuit 21 sets the actual luminance of the divided regions Dd other than the divided region Dd (1, 4) out of the divided regions Dd to the full lighting luminance (50).

In the frame N+1 illustrated in the middle part of FIG. 31, the tentative actual luminance in the divided region Dd (1, 4) out of the divided regions Dd is 115, which is higher than the first full lighting luminance (100). In the divided region Dd (1, 4), the second comparison luminance (65 (=115−50×1)) calculated by Expression (B) is lower than the first full lighting luminance (100). Therefore, in the frame N+1 illustrated in the lower part of FIG. 31, the drive circuit 21 sets the actual luminance of the divided region Dd (1, 4) to the first full lighting luminance (100). As a result, the luminance of the light sources 31 is adjusted to the actual luminance illustrated in the lower part of FIG. 31.

The following describes the case where the drive circuit 21 calculates the tentative actual luminance and the actual luminance in the frame N+2.

FIG. 32 is a diagram of the required luminance of the light source 31, the tentative actual luminance of the light source 31, and the actual luminance of the light source 31 in the divided regions Dd of the frame N+2 according to the third modification of the embodiment of the present disclosure. The drive circuit 21 calculates the required luminance illustrated in the upper part of FIG. 31 at Step S143 in the frame N+1 immediately before the present frame (frame N+2).

At Step S144, the drive circuit 21 calculates the required luminance of the frame immediately before the present frame as the tentative actual luminance as described above.

Specifically, in the frame N+2 illustrated in the middle part of FIG. 32, the drive circuit 21 sets the tentative actual luminance of each of the divided regions Dd to the required luminance illustrated in the upper part of FIG. 31.

Subsequently, the drive circuit 21 performs the processing at Steps S145 and S146 in the same manner as in the first modification described above and sets the full lighting luminance to 100. The drive circuit 21 performs the processing at Step S147 in the same manner as in the first modification described above and calculates the actual luminance.

Specifically, in the frame N+2 illustrated in the middle part of FIG. 32, the tentative actual luminance in the divided regions Dd other than the divided region Dd(1, 3) out of the divided regions Dd is 0 or 50, which is equal to or lower than the first full lighting luminance (100). In the divided regions Dd other than the divided region Dd (1, 3) out of the divided regions Dd, the first comparison luminance (0 (=0×1) or 50 (=50×1)) calculated by Expression (A) is equal to or lower than the full lighting luminance (100). Therefore, in the frame N+2 illustrated in the lower part of FIG. 32, the drive circuit 21 sets the actual luminance of the divided regions Dd other than the divided region Dd (1, 3) out of the divided regions Dd to the full lighting luminance (100 (=first full lighting luminance)).

By contrast, in the frame N+2 illustrated in the middle part of FIG. 32, the tentative actual luminance in the divided region Dd (1, 3) out of the divided regions Dd is 115, which is higher than the first full lighting luminance (100). In the divided region Dd (1, 3), the second comparison luminance (15 (=115−100×1)) calculated by Expression (B) is lower than the full lighting luminance (100). Therefore, in the frame N+2 illustrated in the lower part of FIG. 32, the drive circuit 21 sets the actual luminance of the divided region Dd (1, 3) to the first full lighting luminance (100). As a result, the luminance of the light sources 31 is adjusted to the actual luminance illustrated in the lower part of FIG. 32. The luminance of the light sources 31 at this time is equal to the first full lighting luminance.

As described above, if the drive circuit 21 according to the third modification selects the second lighting control, the drive circuit 21 also gradually increases the luminance of the light source 31 from the luminance of the light source 31 lower than the first full lighting luminance to the first full lighting luminance from when it selects the second lighting control.

The following describes the display system 100 according to a fourth modification of the embodiment described above focusing mainly on the differences from the display system 100 according to the first modification of the embodiment described above. The second lighting control according to the fourth modification is different from that according to the first modification of the embodiment described above in the tentative actual luminance of the light source 31 calculated by the drive circuit 21 at Step S144 illustrated in FIG. 26. The following explanation starts with the point of time when the second lighting control is started and the drive circuit 21 finishes the processing at Step S143 in the frame N+1. Until this point of time, the drive circuit 21 operates in the same manner as in the first modification described above.

In the fourth modification, the drive circuit 21 calculates the average of the required luminance and the actual luminance of the frame immediately before the present frame as the tentative actual luminance at Step S144.

Specifically, in the frame N immediately before the present frame (frame N+1), the drive circuit 21 calculates the required luminance illustrated in the middle part of FIG. 20 and the actual luminance illustrated in the lower part of FIG. 20. Therefore, in the frame N+1, the drive circuit 21 calculates the average of the required luminance and the actual luminance illustrated in FIG. 20 as the tentative actual luminance. The tentative actual luminance of the frame N+1 is the same as the tentative actual luminance illustrated in the middle part of FIG. 31.

Subsequently, the drive circuit 21 performs the processing at Steps S145 and S146 illustrated in FIG. 26 in the same manner as in the first modification described above and sets the full lighting luminance to 50. The drive circuit 21 performs the processing at Step S147 in the same manner as in the first modification described above and calculates the actual luminance.

The tentative actual luminance in the frame N+1 is the same as the tentative actual luminance illustrated in the middle part of FIG. 31. Therefore, the actual luminance in the frame N+1 is the same as the actual luminance illustrated in the lower part of FIG. 31. As a result, the luminance of the light sources 31 is adjusted to the actual luminance illustrated in the lower part of FIG. 31.

The following describes the case where the drive circuit 21 calculates the tentative actual luminance and the actual luminance in the frame N+2.

FIG. 33 is a diagram of the required luminance of the light source 31, the tentative actual luminance of the light source 31, and the actual luminance of the light source 31 in the divided regions Dd of the frame N+2 according to the fourth modification of the embodiment of the present disclosure.

At Step S144, the drive circuit 21 calculates the average of the required luminance and the actual luminance of the frame immediately before the present frame as the tentative actual luminance as described above.

Specifically, the required luminance and the actual luminance of the frame (frame N+1) immediately before the present frame (frame N+2) are illustrated in the upper and lower parts of FIG. 31.

Therefore, in the frame N+2 illustrated in the middle part of FIG. 33, the tentative actual luminance of the divided region Dd (0, 3) is 50 (=(50 (refer to the upper part of FIG. 31)+50 (refer to the lower part of FIG. 31))/2), and the tentative actual luminance of the divided region Dd (1, 2) is 50 (=(50 (refer to the upper part of FIG. 31)+50 (refer to the lower part of FIG. 31))/2).

In the frame N+2 illustrated in the middle part of FIG. 33, the tentative actual luminance of the divided region Dd (1, 3) is 82.5 (=(115 (refer to the upper part of FIG. 31)+50 (refer to the lower part of FIG. 31))/2), and the tentative actual luminance of the divided region Dd (1, 4) is 50 (=(0 (refer to the upper part of FIG. 31)+100 (refer to the lower part of FIG. 31))/2).

The tentative actual luminance of the divided regions Dd other than the divided region Dd (0, 3), Dd (1, 2), Dd(1, 3), or Dd (1, 4) out of the divided regions Dd is 25 (=(0 (refer to the upper part of FIG. 31)+50 (refer to the lower part of FIG. 31))/2).

Subsequently, the drive circuit 21 performs the processing at Steps S145 and S146 in the same manner as in the first modification described above and sets the full lighting luminance to 100. The drive circuit 21 performs the processing at Step S147 in the same manner as in the first modification described above and calculates the actual luminance.

Specifically, in the frame N+2 illustrated in the middle part of FIG. 33, the tentative actual luminance of each of the divided regions Dd is equal to or lower than the first full lighting luminance (100). In the divided regions Dd, the first comparison luminance (any of 25, 50, and 82.5) calculated by Expression (A) is equal to or lower than the full lighting luminance (100). Therefore, in the frame N+2 illustrated in the lower part of FIG. 33, the drive circuit 21 sets the actual luminance of each of the divided regions Dd to the full lighting luminance (100 (=first full lighting luminance)). As a result, the luminance of the light sources 31 is adjusted to the actual luminance illustrated in the lower part of FIG. 33. The luminance of the light sources 31 at this time is equal to the first full lighting luminance.

As described above, if the drive circuit 21 according to the fourth modification selects the second lighting control, the drive circuit 21 also gradually increases the luminance of the light source 31 from the luminance of the light source 31 lower than the first full lighting luminance to the first full lighting luminance from when it selects the second lighting control.

The following describes the display system 100 according to a fifth modification of the embodiment described above focusing mainly on the differences from the display system 100 according to the first modification of the embodiment described above. The second lighting control according to the fifth modification is different from that according to the first modification of the embodiment described above in the tentative actual luminance of the light source 31 calculated by the drive circuit 21 at Step S144 illustrated in FIG. 26. The following explanation starts with the point of time when the second lighting control is started and the drive circuit 21 finishes the processing at Step S143 in the frame N+1. Until this point of time, the drive circuit 21 operates in the same manner as in the first modification described above.

FIG. 34 is a diagram of the required luminance of the light source 31, the tentative actual luminance of the light source 31, and the actual luminance of the light source 31 in the divided regions Dd of the frame N+1 according to the fifth modification of the embodiment of the present disclosure. In the frame N+1, the drive circuit 21 calculates the required luminance illustrated in the upper part of FIG. 34 (identical to the required luminance illustrated in the middle part of FIG. 23) at Step S143 illustrated in FIG. 26. In the frame N immediately before the present frame (frame N+1), the drive circuit 21 calculates the actual luminance illustrated in the lower part of FIG. 20.

In the fifth modification, the drive circuit 21 first calculates the direction and the amount of movement of the display image between the present frame and the frame immediately before the present frame at Step S144 illustrated in FIG. 26. Specifically, the drive circuit 21 calculates the direction and the amount of movement of the display image between the frames N and N+1. The direction and the amount of movement of the display image correspond to the direction and the amount of movement of the selection range H illustrated in FIG. 10.

In the fifth modification, the direction and the amount of movement of the display image are equal to the direction and the amount of movement of the high-luminance part L illustrated in FIG. 18. In other words, the direction of movement of the display image between the frames N and N+1 is the direction toward the −X side along the X-direction, and the amount of movement of the display image is equal to the length of one side of the divided region Dd as described above.

At Step S144, the drive circuit 21 sets the tentative actual luminance of the present frame to the actual luminance of the frame immediately before the present frame shifted in the direction of movement by the amount of movement equal to the direction and the amount of movement of the display image. In other words, in the fifth embodiment, the tentative actual luminance of the divided region Dd in the frame N+1 corresponds to the actual luminance of the divided region Dd in the frame N shifted to the −X side by one column.

Specifically, the tentative actual luminance of the divided regions Dd in the [h=0, 1, 2, 3, 4]-th columns in the frame N+1 illustrated in the middle part of FIG. 34 corresponds to the actual luminance of the divided regions Dd in the [h=1, 2, 3, 4, 5]-th columns in the frame N illustrated in the lower part of FIG. 20.

The drive circuit 21 sets the tentative actual luminance of the divided region Dd that displays a new display image in the frame N+1 to the first full lighting luminance. The first full lighting luminance is 100 as in the first modification described above.

The image displayed in the divided regions Dd in the [h=5]-th column in the frame N+1 has no corresponding part in the display image in the frame N and corresponds to a new display image. Therefore, in the frame N+1 illustrated in the middle part of FIG. 34, the tentative actual luminance of the divided regions Dd in the [h=5]-th column is the first full lighting luminance (100).

Subsequently, the drive circuit 21 performs the processing at Steps S145 and S146 illustrated in FIG. 26 in the same manner as in the first modification described above and sets the full lighting luminance to 50. The drive circuit 21 performs the processing at Step S147 in the same manner as in the first modification described above and calculates the actual luminance.

Specifically, in the frame N+1 illustrated in the middle part of FIG. 34, the tentative actual luminance in the divided regions Dd other than the divided region Dd (1, 3) or the divided regions Dd in the [h=5]-th column out of the divided regions Dd is 0 or 50, which is equal to or lower than the first full lighting luminance (100).

In the divided regions Dd other than the divided region Dd (1, 3) or the divided regions Dd in the [h=5]-th column out of the divided regions Dd, the first comparison luminance (0 (=0×1) or 50 (=50×1)) calculated by Expression (A) is equal to or lower than the full lighting luminance (50). Therefore, in the frame N+1 illustrated in the lower part of FIG. 34, the drive circuit 21 sets the actual luminance of the divided regions Dd other than the divided region Dd (1, 3) or the divided regions Dd in the [h=5]-th column out of the divided regions Dd to the full lighting luminance (50).

In the divided regions Dd in the [h=5]-th column out of the divided regions Dd, the tentative actual luminance is 100, which is equal to the first full lighting luminance (100). In the divided region Dd of the [h=5]-th column, the first comparison luminance (100 (=100×1)) calculated by Expression (A) is higher than the full lighting luminance (50). Therefore, in the frame N+1 illustrated in the lower part of FIG. 34, the drive circuit 21 sets the actual luminance of the divided regions Dd in the [h=5]-th column to 100, which is equal to the tentative actual luminance.

In the frame N+1 illustrated in the middle part of FIG. 34, the tentative actual luminance in the divided region Dd (1, 3) out of the divided regions Dd is 115, which is higher than the first full lighting luminance (100). In the divided region Dd (1, 3), the second comparison luminance (65 (=115−50×1)) calculated by Expression (B) is lower than the first full lighting luminance (100). Therefore, in the frame N+1 illustrated in the lower part of FIG. 34, the drive circuit 21 sets the actual luminance of the divided region Dd (1, 3) to the first full lighting luminance (100). As a result, the luminance of the light sources 31 is adjusted to the actual luminance illustrated in the lower part of FIG. 34.

The following describes the case where the drive circuit 21 calculates the tentative actual luminance and the actual luminance in the frame N+2.

FIG. 35 is a diagram of the required luminance of the light source 31, the tentative actual luminance of the light source 31, and the actual luminance of the light source 31 in the divided regions Dd of the frame N+2 according to the fifth modification of the embodiment of the present disclosure.

At Step S144, the drive circuit 21 sets the tentative actual luminance of the present frame (N+2) to the actual luminance of the frame N+1 immediately before the present frame N+2 shifted in the direction of movement by the amount of movement equal to the direction and the amount of movement of the display image in the same manner as described above.

The direction of movement of the display image between the frames N+1 and N+2 is the direction toward the −X side along the X-direction, and the amount of movement of the display image is equal to the length of one side of the divided region Dd. Therefore, the tentative actual luminance of the divided region Dd in the frame N+2 corresponds to the actual luminance of the divided region Dd in the frame N+1 shifted to the −X side by one column.

Specifically, the tentative actual luminance of the divided regions Dd in the [h=0, 1, 2, 3, 4]-th columns in the frame N+2 illustrated in the middle part of FIG. 35 corresponds to the actual luminance of the divided regions Dd in the [h=1, 2, 3, 4, 5]-th columns in the frame N illustrated in the lower part of FIG. 34.

The image displayed in the divided regions Dd in the [h=5]-th column in the frame N+2 has no corresponding part in the display image in the frame N+1 and corresponds to a new display image. Therefore, in the frame N+2 illustrated in the middle part of FIG. 35, the tentative actual luminance of the divided regions Dd in the [h=5]-th column is the first full lighting luminance (100).

Subsequently, the drive circuit 21 performs the processing at Steps S145 and S146 in the same manner as in the first modification described above and sets the full lighting luminance to 100. The drive circuit 21 performs the processing at Step S147 in the same manner as in the first modification described above and calculates the actual luminance.

Specifically, in the frame N+2 illustrated in the middle part of FIG. 35, the tentative actual luminance of each of the divided regions Dd is equal to or lower than the first full lighting luminance (100). In the divided regions Dd, the first comparison luminance (50 or 100) calculated by Expression (A) is equal to or lower than the full lighting luminance (100). Therefore, in the frame N+2 illustrated in the lower part of FIG. 35, the drive circuit 21 sets the actual luminance of each of the divided regions Dd to the full lighting luminance (100 (=first full lighting luminance)). As a result, the luminance of the light sources 31 is adjusted to the actual luminance illustrated in the lower part of FIG. 35. The luminance of the light sources 31 at this time is equal to the first full lighting luminance.

As described above, if the drive circuit 21 according to the fifth modification selects the second lighting control, the drive circuit 21 also gradually increases the luminance of the light source 31 from the luminance of the light source 31 lower than the first full lighting luminance to the first full lighting luminance from when it selects the second lighting control.

While the exemplary embodiments of the present disclosure have been described, the embodiments are not intended to limit the present disclosure. The contents disclosed in the embodiments are given by way of example only, and various modifications may be made without departing from the spirit of the present disclosure.

Appropriate modifications made without departing from the spirit of the present disclosure naturally fall within the technical scope of the present disclosure.

For example, the first display panel 20*a* and the second display panel 20*b* may be integrated. In this case, the first display panel 20*a* and the second display panel 20*b* provided as an integrated panel have one display region DA. In the display region DA, an image for the left eye is displayed on the −X side, and an image for the right eye is displayed on the +X side. In this case, the number of lenses 2*b* may be one corresponding to one display region DA, and the first light source device 30*a* and the second light source device 30*b* may be integrated.

The increment in full lighting luminance at Step S146 illustrated in FIG. 26 is 50% of the first full lighting luminance, but needless to say, the increment is not limited thereto. In this case, the increment in full lighting luminance and the unit time are proportional to each other, but needless to say, they are not necessarily proportional. For example, the drive circuit 21 may increase the luminance of the light source 31 from luminance of the light source 31 lower than the first full lighting luminance to the first full lighting luminance every unit time according to the following Expression (1):

$$L_{n+1}=L_n+(La-L_n)\times K \quad (1)$$

In Expression (1), $L_{n+1}$ and $L_n$ are the luminance of the light source 31, and $L_n$ is the luminance of the light source 31 immediately before (i.e., the previous frame of) $L_{n+1}$. n is an integer equal to or larger than 1. The luminance of the light source 31 when n=1 is satisfied (i.e., $L_1$) is the predetermined luminance. La is the first full lighting luminance. K is a coefficient indicating a decrease in the ratio of increase in luminance of the light source 31 and is a value between 1/16 and 1/2, for example. Expression (1) is what is called an infinite impulse response (IIR) filter.

If the drive circuit 21 selects the first lighting control when the second lighting control is selected, the drive circuit 21 may gradually decrease the luminance of the light source 31 from the first full lighting luminance to the luminance of the light source 31 at which the amount of light of the divided region Dd is the required amount of light in each of the divided regions Dd from when it selects the first lighting control. As described above, the luminance of the light sources 31 is the first full lighting luminance when the second lighting control is finished. At Step S13 in the first lighting control illustrated in FIG. 12, the drive circuit 21 first calculates the amount of decrease in luminance of the light source 31 (e.g., 50% of the first full lighting luminance of the frame immediately before the present frame) and subtracts the amount of decrease from the first full lighting luminance. The drive circuit 21 compares the luminance of the light source 31 obtained by subtracting the amount of decrease from the first full lighting luminance with the required luminance in each of the divided regions Dd and determines one of them with a larger value to be the actual luminance. The drive circuit 21 subtracts the amount of decrease from the first full lighting luminance every predetermined time. As a result, the luminance of the light source 31 in each of the divided regions Dd gradually decreases from the first full lighting luminance to the luminance of the light source 31 at which the amount of light of the divided region Dd is the required amount of light in each of the divided regions Dd.

The drive circuit 21 may determine whether the amount of movement per unit time of the display panel 20 is smaller than the predetermined amount of movement at Step S35 illustrated in FIG. 21. If the amount of movement per unit time of the display panel 20 is equal to or larger than the predetermined amount of movement (No at Step S35), the drive circuit 21 performs the processing at Step S31 again. By contrast, if the amount of movement per unit time of the display panel 20 is smaller than the predetermined amount of movement (Yes at Step S35), the drive circuit 21 terminates the second lighting control. In other words, when the second lighting control is selected, the drive circuit 21 terminates the second lighting control based on the fact that the amount of movement per unit time of the display panel 20 is smaller than the predetermined amount of movement.

The full lighting luminance according to the embodiment described above is the first full lighting luminance. Alternatively, the full lighting luminance may be second full lighting luminance corresponding to the luminance of the light source 31 at which the luminance of the sub-pixels SP is the luminance of the sub-pixels SP corresponding to the maximum value of the gradation of the sub-pixels SP when the drive circuit 21 turns on all the light sources 31. The second full lighting luminance according to the present embodiment is 100, which is equal to the first light source luminance (refer to FIG. 9). In this case, the drive circuit 21 does not necessarily specify the largest required amount of light out of the required amounts of light of the divided regions Dd at Step S33 illustrated in FIG. 21.

If the drive circuit 21 according to the first modification of the embodiment described above selects the second lighting control, the drive circuit 21 may gradually increase the luminance of the light source 31 from the luminance of the light source 31 lower than the second full lighting luminance to the second full lighting luminance from when it selects the second lighting control. In this case, the predetermined luminance at Step S141 illustrated in FIG. 26 is the luminance of the light source 31 lower than the second full lighting luminance. The drive circuit 21 determines whether the full lighting luminance is equal to or higher than the second full lighting luminance at Step S145. To calculate the tentative actual luminance at Step S147, the drive circuit 21 compares the first comparison luminance, which is the luminance of the light source 31 calculated by Expression (A), with the full lighting luminance for the divided region Dd having the tentative actual luminance equal to or lower than the second full lighting luminance out of the divided regions Dd and determines one of them with a larger value to be the actual luminance of the divided region Dd. The drive circuit 21 compares the second comparison luminance, which is the luminance of the light source 31 calculated by Expression (B), with the second full lighting luminance for the divided region Dd having the tentative actual luminance higher than the second full lighting luminance out of the divided regions Dd and determines one of them with a larger value to be the actual luminance of the divided region Dd.

The sensor 40 may be provided not to the display device 1 but to the external device 200. In this case, the sensor 40 may detect the movement of the display panel 20 by processing a camera and images captured by the camera, for example.

The display system 100 may not be a VR system but be a navigation system for vehicles (what is called a car navigation system). In this case, the display device 1 is mounted on a vehicle, and the display image is a map image, for example. In this case, the sensor 40 detects the speed of the vehicle and the amount of operation on the steering wheel (e.g., the amount of rotation per unit time of the steering wheel) provided to the vehicle.

Out of other advantageous effects achieved by the aspects described in the present embodiment, advantageous effects clearly defined by the description in the present specification or appropriately conceivable by those skilled in the art are naturally achieved by the present disclosure.

What is claimed is:

1. A display device comprising:

a display panel comprising a display region for displaying an image;

a light source device comprising a plurality of light sources configured to emit light toward the display panel; and a drive circuit configured to drive the display panel based on an image signal including information on the image, wherein the display region is divided into a plurality of divided regions, the light sources are disposed corresponding to the respective divided regions, the drive circuit selects one of first lighting control for adjusting luminance of the light source for each of the light sources based on the image signal and second lighting control for turning on all the light sources to control the light source device, and the drive circuit selects the second lighting control based on an amount of movement per unit time of the display panel being equal to or larger than a predetermined amount of movement.

2. The display device according to claim 1, wherein a part of the image displayed in the display region moves in the display region due to movement of the display panel, and the predetermined amount of movement is such an amount of movement per unit time of the display panel that an amount of movement per unit time of the part of the image due to the movement of the display panel is equal to or larger than a size of the divided region.

3. The display device according to claim 1, wherein the drive circuit calculates a required amount of light that is an amount of light of the divided region required for each of the divided regions based on the image signal, and the drive circuit specifies, when selecting the second lighting control, the largest required amount of light out of the required amounts of light of the divided regions and turns on each of the light sources at first full lighting luminance that is the luminance of the light source at which the amount of light of the divided region is the largest required amount of light in each of the divided regions when each of the light sources are turned on.

4. The display device according to claim 3, wherein the drive circuit gradually increases, when selecting the second lighting control, the luminance of the light source from luminance of the light source lower than the first full lighting luminance to the first full lighting luminance from when the drive circuit selects the second lighting control.

5. The display device according to claim 4, wherein the drive circuit increases the luminance of the light source from the luminance of the light source lower than the first full lighting luminance to the first full lighting luminance every unit time according to Expression (1):

$$L_{n+1}=L_n+(La-L_n)\times K \quad (1)$$

where $L_{n+1}$ and $L_n$ are the luminance of the light source, $L_n$ is the luminance of the light source immediately before $L_{n+1}$, n is an integer equal to or larger than 1, La is the first full-lighting luminance, and K is a coefficient indicating a decrease in a ratio of increase in luminance of the light source.

6. The display device according to claim 3, wherein the drive circuit gradually decreases, when selecting the first lighting control when the second lighting control is selected, the luminance of the light source from the first full lighting luminance to luminance of the light source at which the amount of light of the divided region is the required amount of light in each of the divided regions from when the drive circuit selects the first lighting control.

7. The display device according to claim 1, wherein the display panel further comprises a plurality of sub-pixels constituting the image, and the drive circuit turns on, when selecting the second lighting control, each of the light sources at second full lighting luminance corresponding to the luminance of the light source at which the luminance of the sub-pixels is the luminance of the sub-pixels corresponding to a maximum value of gradation of the sub-pixels when the drive circuit turns on all the light sources.

8. The display device according to claim 1, wherein the drive circuit terminates, when selecting the second lighting control, the second lighting control based on a predetermined time having elapsed since time when the second lighting control is selected.

9. The display device according to claim 1, wherein the drive circuit terminates, when selecting the second lighting control, the second lighting control based on the amount of movement per unit time of the display panel being smaller than the predetermined amount of movement.

10. The display device according to claim 1, wherein the drive circuit calculates the amount of movement of the display panel based on a detection value of a sensor configured to detect acceleration.

11. A display system comprising:

the display device according to claim 1; and a lens.

12. A display device comprising:

a display panel comprising a display region for displaying an image;

a light source device comprising a plurality of light sources configured to emit light toward the display panel;

a sensor configured to detect acceleration of the display panel; and a drive circuit configured to drive the display panel based on an image signal including information on the image, wherein the display region is divided into a plurality of divided regions, the light sources are disposed corresponding to the respective divided regions, the drive circuit calculates an amount of movement per unit time of the display panel based on a detection value of the sensor, the drive circuit selects one of first lighting control for adjusting luminance of the light source for each of the light sources based on the image signal and second lighting control for turning on all the light sources to control the light source device, and the drive circuit selects the second lighting control based on an amount of movement per unit time of the display panel being equal to or larger than a predetermined amount of movement.

* * * * *